(12) United States Patent
Hornbeck et al.

(10) Patent No.: US 7,805,380 B1
(45) Date of Patent: Sep. 28, 2010

(54) SYSTEMS AND METHODS FOR OPTIMIZED WATER ALLOCATION

(75) Inventors: David Hornbeck, Northridge, CA (US);
Dennis J. Coady, Oceanside, CA (US);
Patrick J. Maloney, Alameda, CA (US)

(73) Assignee: Patrick J. Maloney, Jr., Alameda, CA (US)

( * ) Notice: Subject to any disclaimer, the term of this patent is extended or adjusted under 35 U.S.C. 154(b) by 274 days.

(21) Appl. No.: 11/761,896

(22) Filed: Jun. 12, 2007

Related U.S. Application Data

(60) Provisional application No. 60/815,157, filed on Jun. 19, 2006.

(51) Int. Cl.
*G06Q 50/00* (2006.01)
(52) U.S. Cl. .................................................... 705/315
(58) Field of Classification Search ................... 705/315
See application file for complete search history.

(56) References Cited

U.S. PATENT DOCUMENTS

| 6,108,590 | A* | 8/2000 | Hergert | 700/284 |
| 6,327,541 | B1* | 12/2001 | Pitchford et al. | 702/62 |
| 2001/0051933 | A1* | 12/2001 | Rowley et al. | 705/412 |
| 2002/0019802 | A1* | 2/2002 | Malme et al. | 705/37 |
| 2002/0116282 | A1* | 8/2002 | Martin et al. | 705/26 |
| 2005/0246102 | A1* | 11/2005 | Patwardhan et al. | 702/2 |

OTHER PUBLICATIONS

Tagami, Ty, "City Flushes Out Old Debtors Untapped Fortune? Atlanta Records Show About $50 Million in Uncollected Water and Sewer Bills," The Atlanta Journal-Constitution, Atlanta, GA, Jan. 5, 2004, p. D.1.*
Business Wire, "QI Systems Inc. Sees Promising Sales Growth in Water Delivery Control Business," New York, Sep. 15, 2005, p. 1.*
Lais, Sami, "Water Trading Site Makes Its Debut; Suggested: Observers Sayexchange Could Create New Water Rights Battle (Company Business and Marketing)," Computerworld, Feb. 14, 2000, p. 16(1).*
Tom Kuhnle, "The Federal Income Tax Implications of Water Transfers," Stanford Law Review (47 Stan. L. Rev. 533), Feb. 1995, 31 pages.
"Assessment of Water Companies and Water Rights," Assessors' Handbook Section 542, California State Board of Equalization, Dec. 2000, 164 pages.

* cited by examiner

*Primary Examiner*—John W Hayes
*Assistant Examiner*—Nathan Erb
(74) *Attorney, Agent, or Firm*—Patent Law Works LLP

(57) ABSTRACT

The present invention relates to systems and methods for optimizing water allocation. In particular, the present invention relates to systems and methods for establishing and querying a database of information for projecting and optimizing water distribution within a county, city or state and providing useful output as a result of such queries. The system and method also provide for exchange of water rights and the output of data in a useful form, such as a map, graph, list, summary or chart. The system and method also provide for water planning based on consideration of various parameters.

24 Claims, 19 Drawing Sheets

State of California
State Water Resources Control Board
DIVISION OF WATER RIGHTS
1001 I Street, 14th Floor, Sacramento, CA 95812

P.O. Box 2000, Sacramento, CA 95812-2000
Info: (916) 341-5300, FAX: (916) 341-5400, Web: http://www.waterrights.ca.gov

STATEMENT OF WATER DIVERSION AND USE
(This is not a water right)
This Statement should be typewritten or legibly written in ink and submitted to the address above.
A separate statement should be filed for each point of diversion. A duplicate copy will be returned to your file.

A. Name of person diverting water SAMPLE LAND OWNER NAME
   Address SAMPLE ADDRESS
   Telephone: (510) 521-4575

B. Water is used under:  Riparian claim: ☐   Pre 1914 right: ☐   Other (explain) (see footnote 1)

C. Name of the body of water at the point of diversion
   Colorado River (All American Canal)

Tributary to _____
D. Point of diversion is located within Imperial County on Assessors Parcel # 019-070-015 being within the SE 1/4 of SW 1/4 of Section 24, of Township 12 S, Range 11 E, San Bern BM.
   Name of works Imperial Irrigation District                               (see footnote 2)

E. Do you own the land at the point of diversion? Yes ☐ NO ☑ The name and address of the owner of the land is:
   Land is being held in trust by Imperial Irrigation District ( footnote 3)

F. Capacity of diversion works unknown     Capacity of storage tanks or reservoir 0 AF

Type of diversion facility: Gravity ☑   Pump ☐

Method of measurement: Weir ☐  Flume ☐  Electric Meter ☐  Estimate ☑ (see footnote 4)

G. Enter the amount (or approximate amount) of water used each month.
   Amounts below are shown in: Acre-feet

| Year | Jan | Feb | Mar | Apr | May | June | July | Aug | Sept | Oct | Nov | Dec | Total Annual |
|---|---|---|---|---|---|---|---|---|---|---|---|---|---|
| 2000 - 2002 | 23.2 | 27.8 | 40.4 | 49.8 | 52.4 | 48.0 | 53.3 | 48.3 | 41.6 | 37.8 | 28.6 | 22.4 | 473.7 |

H. Annual water use in recent years: Maximum 474 Acre Feet Minimum 0 AF
Year of first use (nearly as known) 1900 (estimated)    (see footnote 5)

I. Purpose of use: What is the water being used for: (example, number of acres and type of crop irrigated, average number of persons served, number of stock watered, etc.) (see footnote 6)

J. General description or location of place of use (example: 40 acres of pasture located 3 miles from Happyville on Alpha Road) ____
   Current water use on 160 acres, about 3/4 mile northwest of Barth Rd and State Hwy 78. See attached map

K. Map: Please locate the point of diversion and place of use on a print of a USGS quad map, or make a sketch on the section grid provided on the reverse side of this form. The sketch should identify the section lines, prominent local landmarks and roads, your point of diversion, and your place of use (your house, acreage irrigated, etc.) .   (see footnote 7)
L. Please answer only those questions below which are applicable to your project.

Additional copies of this form and water right information can be obtained at www.waterrights.ca.gov.

STATEMENT (12-03)                                                              P17614  019-070-015  A

FIG. 16A

1. Conservation of water
   a. Describe any water conservation efforts you may have started:  see footnote 8

2. Water quality and wastewater reclamation
   a. Are you now or have you been using reclaimed water from a wastewater treatment facility, desalination facility or water polluted by waste to a degree which unreasonably affects such water for other beneficial uses? YES ☐ NO ☑.

I declare under penalty of perjury that the information in this report is true to the best of my knowledge and belief.

DATE:_____ at _____, California

SIGNATURE:_____

PRINTED NAME:_____
              (first name)     (middle init.)     (last name)

COMPANY NAME:_____

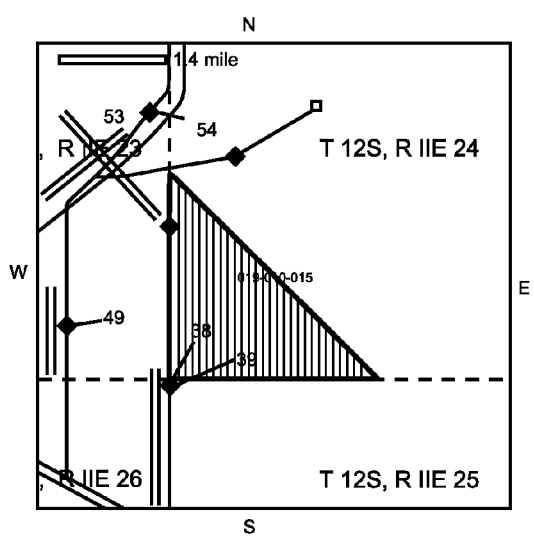

The location of the diversion point and the place of use may be sketched on the section grid provided. If it is used, please enter the section(s), township, range and the base merridian below. Also, show any streams or other landmarks that will assist in identifing the area.

Section(s) __24__

Township __12 S__

Range __11 E__

__San Bern.__ BM

General area of use is within Imperial County and historic San Diego County

GENERAL INFORMATION PERTAINING TO WATER RIGHTS IN CALIFORNIA
There are two principal types of surface water rights in California. They are riparian and appropriative rights.
A riparian right enables an owner of land bordering a natural lake or stream to take and use water on his riparian land. Riparian land must be in the same watershed as the water source and must never have been severed form the source of supply by an intervening parcel without reservation of the riparian right to the severed parcel. Generally, a riparian water user must share the water supply with other riparian users. Riparian rights may be used to divert the natural flow of a stream but may not be used to 1) store water for later use 2) divert water which originates in a different watershed 3) divert water released from storage, or 4) divert return flows from groundwater use.
An appropriative right is required for use of water on nonriparian land and for storage of water. Generally, appropriative rights may be exercised only when there is a surplus not needed by riparian water users. Since 1914 new appropriators have been required to obtain a permit and license form the State.
Statements of Water Diversion and Use must be filed by a riparian and pre-1914 appropriative water users. The filling of a statement (1) provides a record of water use, (2) enables the State to notify such users if someone proposes a new appropriation upstream from their diversion, and (3) assists the State to determine if additional water is available for future appropriators.
The above discussion is provided for general information. For more specific information concerning water rights, please contact an attorney or write to this office. We have several pamphlets available. They include: (1) Statements of Water Diversion and Use, (2) Information Pertaining to Water Right in California and (3) Appropriation of Water in California.

STATEMENT (12-03)                                                              P17614  019-070-015  A

FIG. 16B

STATEMENT OF WATER DIVERSION AND USE FOOTNOTES

Footnote 1 - CLAIM OF RIGHT:
Claimant(s) relies on predecessor's pre-1914 claims as set forth in the decrees, decisions, and record submitted in Arizona v. California, including the chains of title, admissions of the Imperial Irrigation District, testimony and exhibits therein.

The Seven-Party Agreement -

Claimant(s) relies on the record, admissions, and holdings in Bryant v. Yellen (1980) 447 US 352.

Claimant(s) relies on California law as applicable to irrigation districts, i.e., the Wright Act, as currently codified in the Water Code, including, but not limited to sections 22250 et seq., 22437 and the authority interpreting said statutory and customary law.

Claimant(s) relies on the public policy of the State of California with respect to conservation and optimization of water resources, including but not limited to Water Code section 1011.

Claimant(s) rely on WRO 2002-0013.

With respect to water used or related to power development, claimant(s) rely on Nev-Cal Electric Securities v. IID (1936) 85 F.2d 886, cert denied.

Footnote 2 - POINT(S) OF DIVERSION:
Colorado River at Imperial Dam, Sec 9 Township 15 S Range 24 E SBM as per Permit 7643 point, and the Whitsett Intake at Lake Havasu as a point of diversion. Whitsett Intake is located at N0319200, E3160300 by California Coordinates in Zone 5 and is within Section 28, Township 03 N, Range 27 E, SBB&M.

Footnote 3 - Diversion Points: The primary diversion system is operated by IID for the benefit of landowners pursuant to a Trust established by the landowners. There is re-diversion from IID's system to the landowners system. The diversion point to the Landowner's system is set forth on the attached map.

Footnote 4: This information is under control of IID and we are attempting to obtain said information.

Footnote 5: This is a compilation of the highest uses of water on a monthly basis between 2000-2002. It includes the 100,000-acre feet of water annually diverted to MWD. This calculation is less than the 3.85 MAF annual water to which the landowners are entitled on IID's behalf, i.e., the Seven Party Agreement. The exact entitlement for each parcel will be determined after further information is obtained from IID and then further analysis the Assessor's Records is made.

Footnote 6 - USE OF WATER:
Water is used to irrigate crops including leaching and pre-irrigation and is authorized for related uses, power development, and municipal uses pursuant to the authority stated above.

Footnote 7 - AREAS OF USE:
Imperial County and San Diego County as to pre-1914 rights and additionally the service areas of San Diego County Water Authority and the Coachella Valley Water District, Improvement District No. 1; and Metropolitan Water District, per WRO 2002-0013, and any other Constitutionally permissible area pursuant to the North American Free Trade Agreement and/or Sporhase v. Nebraska, ex rel. Douglas (1982) 458 U.S. 941.

Footnote 8: Diverter and/or diverter's agent(s) utilize a variety of conservation methods depending on variables, including crops grown, soil conditions, and water needs. The methods used and/or available for the diverter include, but are not limited to, crop rotation, fallowing, pump-back systems, sprinklers, drip systems, leveling, and tiling.

FIG. 16C

SYSTEMS AND METHODS FOR OPTIMIZED WATER ALLOCATION

CROSS-REFERENCE TO RELATED APPLICATION

This application claims priority under 35 U.S.C. §119(e) to U.S. Provisional Patent Application Ser. No. 60/815,157, entitled "Systems and Methods for Water Optimization," filed Jun. 19, 2006, which is incorporated herein by reference in its entirety.

BACKGROUND OF THE INVENTION

1. Field of the Invention

The present invention relates generally to systems and methods for optimizing water distribution. More particularly, the present invention relates to systems and methods for establishing and querying a database of information for optimizing water distribution within a defined geographical area and providing useful output as a result of such queries. The system and method also provide for exchange of water rights and the output of data in a useful form, such as a map, graph, list, summary, or chart. The system and method also provide for water planning based on consideration of specified parameters.

2. Description of the Related Art

Water is a vital natural resource. In addition to the aesthetic pleasantries of green lawns, swimming pools and fountain shows in areas that would otherwise be desert without irrigation, water provides the foundation for agriculture, industries and residences to function.

Currently, public databases of information provide listings of an estimated amount of water used per parcel of land by location. Other resources provide additional information related to land, such as water evaporation, climate, crops grown, crop rotation, soil type, ownership, water rights, financial support, investment, or other factors. However, the databases are of questionable accuracy.

In addition, water planning has been executed in a piecemeal, manual fashion. The additional information needed to create a comprehensive water plan is not integrated and therefore incomplete and/or inaccurate projections result.

With the occurrence of more frequent droughts, burgeoning population increases, and the likelihood of global warming impacting the availability of water, there is a need for a way to optimize the allocation of water and the planning of water usage.

SUMMARY OF THE INVENTION

In one or more embodiments, the present invention provides a method for water exchange comprising receiving information related to water usage of a client; receiving from the client a request for a water exchange; determining a potential match for the water exchange request; and transmitting the potential match determination to the client.

The present invention further provides a method for optimizing allocation of water comprising receiving a request for information related to water usage of a party; receiving information related to the party's water usage; determining a projected water usage by the party; determining an optimized allocation of the party's water usage based at least in part on the projected water usage by the party; and displaying the optimized allocation of the party's water usage.

The present invention further provides a method for water planning comprising receiving parameters related to projected water usage of a party; receiving a request for outcomes related to projected water usage of the party; determining outcomes related to projected water usage by the party based at least in part on the received parameters; and displaying the outcomes related to projected water usage by the party.

The present invention further provides a system for water exchange comprising a water usage module configured to receive information related to water usage; a communication module configured to receive a request for a water exchange; and a water exchange module configured to determine a potential match for the water exchange request.

The present invention further provides a system for optimizing allocation of water, the system comprising a water usage module configured to receive information related to water usage by a party; a water projection module configured to estimate projected water usage by the party; and an optimization module configured to determine an optimized allocation of the party's water usage based at least in part on the projected water usage by the party.

The present invention further provides a system for water planning comprising a parameter module configured to receive parameters related to projected water usage by a party; and an outcome determination module configured to determine outcomes related to projected water usage by the party based at least in part on the received parameters.

The present invention further provides a computer program product for producing a user interface of a system for optimizing allocation of water, the user interface comprising a first display area for listing information related to water usage; a second display area, visually distinguished from and concurrently displayed with the first display area, for receiving criteria related to water usage to be included in the first display area; and a third display area, visually distinguished from and concurrently displayed with the first and second display areas, for displaying a water account balance for the client.

The features and advantages described herein are not all-inclusive, and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 4 is a graphical representation of a display device depicting an example of a public water release request according to one embodiment.

FIG. 5 is a graphical representation of a display device depicting an example of a water delivery order according to one embodiment.

FIG. 6 is a graphical representation of a display device depicting another example of a water delivery order according to one embodiment.

FIG. 9 is a graphical representation of a display device depicting an example of a topographic map of parcels owned and/or controlled by an account holder according to one embodiment.

FIG. 10 is a graphical representation of a display device depicting an example of an air photographic map of parcels owned and/or controlled by an account holder according to one embodiment.

FIG. 11 is a graphical representation of a display device depicting an example of a soils map of parcels owned and/or controlled by an account holder according to one embodiment.

FIGS. 16A-16D are examples of forms that have been completed automatically using the present invention according to one embodiment.

Figure 1:
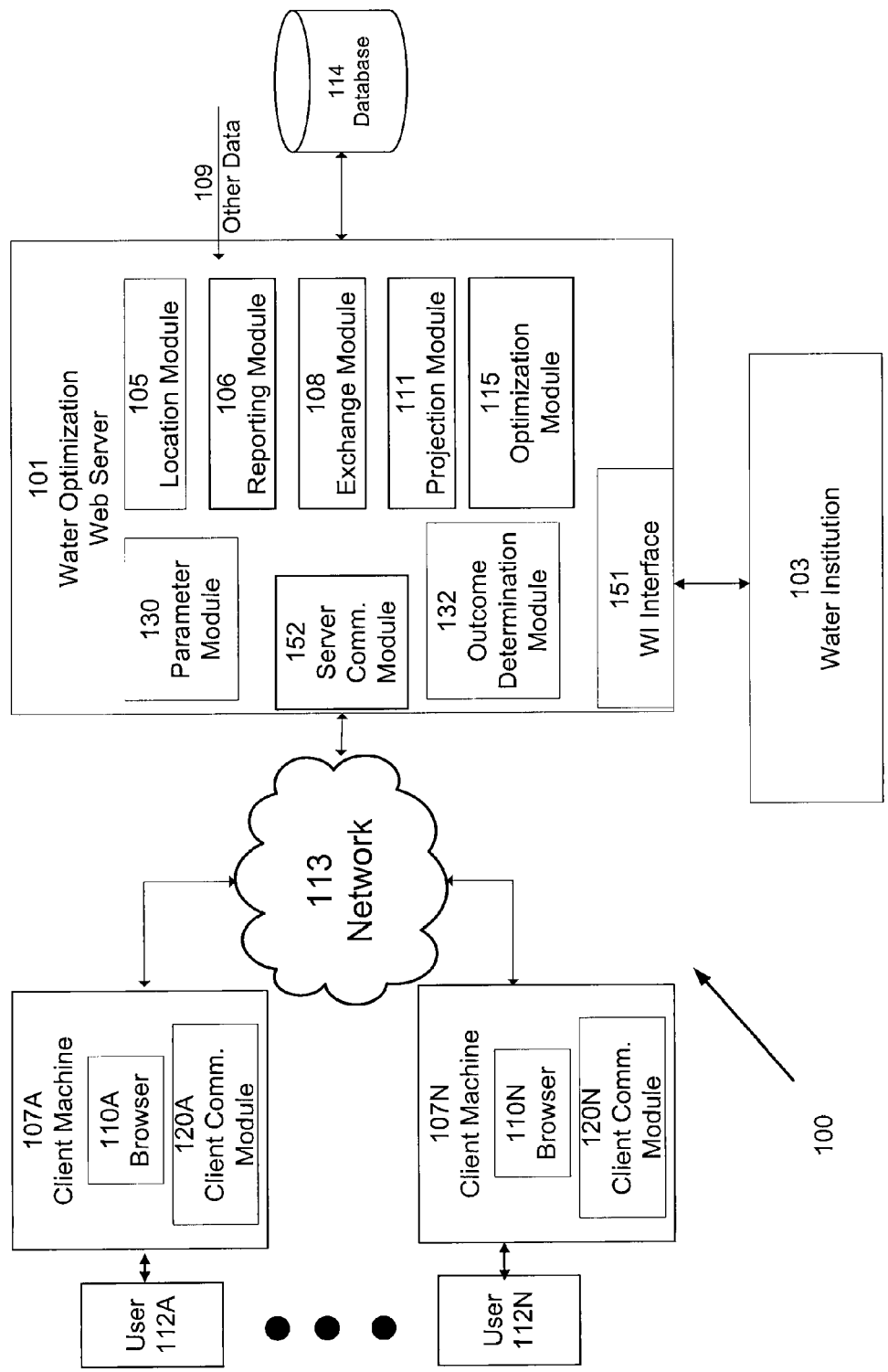
FIG. 1 is a block diagram depicting a system architecture for practicing the present invention according to one embodiment.

One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Systems and methods for optimizing the allocation of water are described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. Furthermore, the particular arrangements of elements in screen shots shown here are illustrative of one embodiment and are not intended to limit the scope of the present invention.

Reference in the specification to "one embodiment," "an embodiment" or "the embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

According to one embodiment, the present invention provides an online tool for assisting users in managing water usage and determining projected water availability. In one embodiment, the online tool uses data received from an agency or institution (such as an irrigation district), combined with user-entered data and/or other data. This combination of data provides more accurate projections of account balances, since it takes into water usage that may not yet be recorded or known to the irrigation district.

By providing users with an accurate picture of their current and projected water account balances, taking into account expected and future transactions and usage, the present invention allows users to better manage their water allocation and to ensure that sufficient water is available for expected needs.

According to another embodiment, the present invention provides a way to estimate optimized water allocation for various users taking into account past, current and projected water usage.

According to another embodiment, the present invention provides a way to plan for different outcomes related to projected water usage based on the consideration of various parameters related to projected water usage.

System

FIG. 1 shows a network 113 connecting a community of users 112A-112N and a water optimization server 101. FIG. 1 illustrates one embodiment by which a plurality of users 112A-112N can manage and exchange information about water usage.

User 112A views, inputs and edits information about water usage using a first client machine 107A. The first client machine 107A includes software and hardware for interacting with the water optimization server 101.

In one embodiment, client machine 107A is a computer of conventional design, and includes a processor, an addressable memory, and other conventional features (not illustrated) such as a display, local memory, input/output ports, and a network interface. In other embodiments one or more of the components of client machine 107A may be located remotely and accessed via the network 113. Client machine 107A interacts with water optimization web server 101 via the network 113 such as the Internet. In one embodiment, the client communication module 120A of client machine 107A performs communication operations to enable such interaction via the Internet or some other network 113 such a LAN, a WAN, a MAN, a wired or wireless network, a private network, a virtual private network, or other networks. In various embodiments, client machine 107A may be implemented as a computer running a Microsoft operating system, Mac OS, various flavors of Linux, UNIX, Palm OS, and/or other operating systems.

Other examples of computing devices will be apparent to one of skill in the art without departing from the scope of the present invention. For example, the first client machine 107A can also be implemented as a personal digital assistant (PDA), a cellular telephone, or another device with web browsing capability.

The client machines 107A-107N are connected to the network 113. The network 113 can be implemented as any electronic medium by which content can be transferred. Through the network 113, the client machines 107A-107N can send and receive data from client machines 107A-107N and the water optimization server 101.

The present invention also includes software operable on the system of FIG. 1. The first user communicates with the system using a Web browser 110A of a conventional type such as Internet Explorer from Microsoft Corp. or Firefox by Mozilla. The Web browser 110A is used in conventional manner to retrieve and present web pages.

In one embodiment, water optimization web server 101 comprises a water institution interface 151 for communicating with water institution 103 and a server communication module 152 for communicating with client machines 107A-107N.

Water optimization web server 101 may comprise several modules coupled via a system bus (not shown). For example, location module 105, reporting module 106, exchange module 108, projection module 111, optimization module 115, parameter module 130, outcome determination module 132, water institution interface 151, and server communication module 152 are coupled together by a system bus, and may send signals to and receive signals from database 114, other data 109 sources, water institutions 103, and to client machines 107A-107N.

The location module 105 provides information about a particular attribute concerning a parcel of land in response to inquiries from the client machine 107A. For example, the location module 105 may provide information regarding geographic location, boundaries, and/or other parcel-related information. The location module 105 sends data to and receives data from client machines 107A-107N via server communication module 152. It also receives information about the parcels of land, for example, from database 114, other data 109 sources, and water institution 103 via water interface 151.

The reporting module 106 provides information on a particular parcel of land in response to the attributes determined by the location module 105, according to one embodiment. The reporting module 106 provides output in a useful form, such as a chart, graph, map, form or the like. The reporting module 106 can be used to automatically enter data into forms, according to one embodiment. The reporting module 106 sends data to and receives data from client machines 107A-107N via server communication module 152. It also receives information from database 114, other data 109 sources, and water institution 103 via water interface 151.

The exchange module 108 locates potential matches in response to a water exchange request. In a private exchange, the exchange module 108 automatically searches for one or more users 112A-112N that desire to exchange a requested amount of water, according to one embodiment. In another embodiment, two water users who have agreed "off-line" to a transfer execute the transfer via the exchange module 108. In a public exchange, the exchange module 108 determines whether the availability of water that has been released to the system is sufficient to satisfy a request or whether the system can accept water from a user, according to one embodiment. The exchange module 108 also provides a way for a user to verify that a potential match is desired by the user, according to one embodiment. After an exchange has been executed, exchange module 108 sends updated account data to water institution 103 via water institution interface 151. The exchange module 108 sends data to and receives data from client machines 107A-107N via server communication module 152. It also receives information from database 114, other data 109 sources, and water institution 103 via water interface 151.

The projection module 111 provides an estimated water usage based on various factors. For example, the projection module 111 may consider current water usage by the user, past water usage by the user, evaporation estimates, soil information, and climate estimates for the user's land. The projection module 111 sends data to and receives data from client machines 107A-107N via server communication module 152. It also receives information from database 114, other data 109 sources, and water institution 103 via water interface 151.

The optimization module 115 determines an optimized allocation of a party's water usage based on many factors. In one embodiment, the optimization module 115 considers total available water, estimated usage by another party, current water usage by another party, past water usage by another party, evaporation estimates, salinity information, crop information, soil types, water rights, and climate estimates. The optimization module 115 sends data to and receives data from client machines 107A-107N via server communication module 152. It also receives information from database 114, other data 109 sources, and water institution 103 via water interface 151.

In one embodiment, the initial distribution of water availability is determined as a share of the total water available, proportional to each member's share of total irrigated acreage. Historically, water usage data has not been collected at a sufficient level to allow accurate analysis at the farm field level. Thus, the initial distribution is based on share of acreage, according to one embodiment.

As additional data about fields and crops are collected by the system, distribution can be enhanced by further analysis of water use efficiency. Administrative decisions can consider soil type, crop mix, efficiency history, and other factors to determine distribution, according to one embodiment. The usage data collected is also incorporated into efficiency planning tools made available to the users.

The parameter module 130 receives parameters related to water usage by a party. For example, the received parameters may include information about total available water in the system; water allocated to the party or to other parties; estimated, current or past water usage; evaporation data or estimates; salinity thresholds; climate data; data for the types of crops that have been or may be grown; crop rotation; soil type; ownership; water rights; financial support; financial investment; and the like. The parameter module 130 sends data to and receives data from client machines 107A-107N via server communication module 152. It also receives information from database 114, other data 109 sources, and water institution 103 via water interface 151.

The outcome determination module 132 is configured to determine outcomes related to projected water usage by the party based at least in part on the received parameters. The outcomes related to projected water usage may include, for example, information related to water needs, return on investment, and crop yields. The outcome determination module 132 sends data to and receives data from client machines 107A-107N via server communication module 152. It also receives information from database 114, other data 109 sources, and water institution 103 via water interface 151.

The basic operation for the above described system is as follows. First, the user 112A interacts with the Internet using a Web browser 110A in the conventional manner. As part of this process, web pages, including content and hypertext links are displayed to the user 112A. The user 112A can select a portion of the web page and provide input. This happens automatically with the user 112A selecting text from a web page being presented and initiates a function provided by the client communication module 120A. The client communication module 120A generates a request for a communication channel using the selected information. The client communication module 120A sends this request to the server communication module 152. The server communication module 152 processes the request.

Processing of the request includes providing a location to the location module 105, and having the location module 105 determine various attributes about a parcel of land. Processing the request can also include the generating a query (such as a user driven query or a query constructed by the location module), which may be sent to parameter module 130, and applying that query to the database 114 to generate a list of information that satisfies the query parameters, such as that determined by outcome determination module 132.

In addition, processing the request may include using the exchange module 108 to locate matches for water exchanges between users or between a user and the system, using projection module 111 to provide estimated water usage based on various factors, and/or using optimization module 115 to determine an optimized allocation of water usage based on many factors, as described above. Finally, processing the request may also include using the reporting module 106 to generate a map or other information that includes the attributes related to a parcel of land based on the selected input and/or automatically completing forms related to the water transfer. The processed information is then returned to the client communication module 120A.

The database 114 stores a variety of different types of information about parcels of land, and is responsive to queries from the client machines 107A-107N. There are a variety of parameters that can be set by the user 112A to expose any portion of the data. The database 114 includes a first data portion that is relatively static in that it changes relatively infrequently. The database 114 includes a second data portion that is relatively dynamic in that the data changes frequently. For example, the second data portion can include information about water usage, climate, crops grown, crop rotation, soil type, ownership, water rights, financial support and/or investment.

The database 114 has software for interfacing one or more data stores. For example, database 114 can receive information from, for example, assessors' offices, irrigation districts, the United States Geological Survey, universities, colleges, almanacs, museums, libraries, bureaus of reclamation, a spatial database within a Graphical Information System ("GIS") and/or farm bureaus.

In one embodiment of database 114, namely a spatial data model, reality can be represented by four spatial entities. These four elements are point, line, area, volume. In their most simplified form, spatially linked data are information associated with a specific location: for example, the location of a canal gate, or a farmer's crop. While there are an infinite number and variety of spatial data, these four spatial elements can replicate complicated geographic relationships and patterns.

An alternate embodiment of database 114, a spatial database within a GIS is a collection of spatially referenced data that are combined to reflect reality and can be manipulated, transformed, and analyzed before being displayed on a map. The ways in which the four spatial data types are organized and modeled within a GIS determine to a very large extent its capabilities and functionality.

In another embodiment of database 114, an object-oriented data model structured as the foundation of a GIS provides the ability to hold spatial data (attributes) in a database and enables the user to perform specific spatial queries. A spatial query seeks to find answers to geographical questions concerning but not limited to "adjacent," "within," "about," "near," "intersect," and "overlay." An object-oriented spatial data model does not organize and retrieve data based on the usual linked tables, but rather on data organized by object and class. In its most basic form, one object contains three classes based on three geographical elements which are all inherited.

According to another embodiment of database 114, a searchable database, such as a water datamart, is a relational database capable of housing, among other data, location information. The database can be interconnected with existing systems containing parcel and mapping data, and can be pre-populated with critical geographic datasets (i.e. streets and boundaries). The water datamart accepts farm specific location data, such as water distribution points, crops, canals, gates, location, water delivery and associated governmental data. The output resulting from search queries of the database may be, for example, a chart, list, graph, summary, or interactive map.

Another example of database 114 is a private database of water management. This would provide a way to accurately track and manage various factors related to water usage associated with persons or entities.

Water exchange module 108 also allows user 112A to securely access and manage his or her water accounts, which may include information provided by water institution 103. Water institution 103 can be one or more institutions, such as irrigation districts, government agencies, private water management agencies, or the like. In one embodiment, password protection and authentication, 128-bit encryption, SHTML, and other security features are used to ensure the security of the user's data. Once user 112A has been authenticated, exchange module 108 obtains water data including total water availability data and/or allocated water data from water institution 103, including dates, amounts, and the like.

Water exchange module 108 sends HTML code or other presentation technologies to browser 110 causing browser 110 to present a user interface to user 112. The user interface allows the user to enter transactions and/or parcel information, as well as to review water account balances and view transaction information.

When user 112A enters transactions and/or other water-related data, the user-entered data is transmitted via client communication module 120A to server communication module 152. Exchange module 108 searches and transmits potential matches. The user 112A may then accept or reject potential matches, according to one embodiment.

Figure 16D:
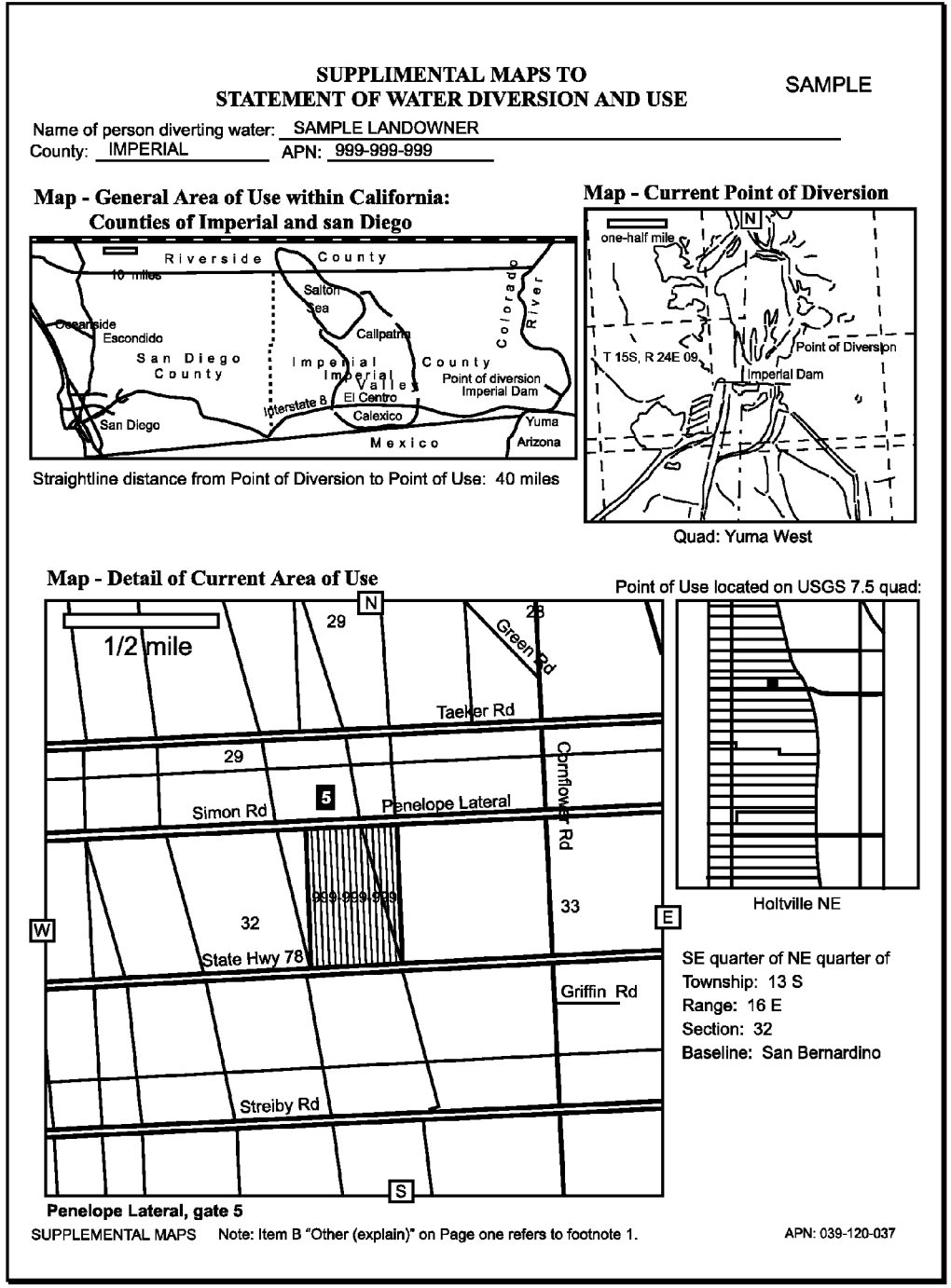

If an exchange is requested, water exchange module 108 determines if sufficient water is available to satisfy the request for transfer between users, or between the system and a user. If the exchange is accepted, according to one embodiment, water exchange module 108 sends information about such exchanges (also known as a "paper" water transfer") to the water institution 103 via water institution interface 151 and/or via a form provided by the water institution 103, such as those shown in FIGS. 16A-16B. As an example, a Delivery Order may entered by a user 112A to direct to the water institution 103 to supply the actual "wet water" (also known as a "wet" water transfer) to the transferee user's irrigation gate. If the transferor user's account has sufficient acre feet of water available to be transferred, the system forwards the Delivery Order to the water institution's Water Master, according to one embodiment. The Order for the transfer of water is delivered by, for example, direct data connection, email, mail and/or fax. The Water Master adds the Order to deliver the "wet water" to the delivery schedule, according to one embodiment. The amount of available water can then be determined by subtracting the released amount from the user's water balance or adding the acquired amount to the user's balance.

In one embodiment, water exchange module 108 can provide information to various regulatory bodies to satisfy reporting requirements. For example, to comply with statutory, ordinance and/or regulatory requirements, water exchange module 108 can provide data of various types, such as data concerning water exchanges, usage and availability, to agencies or institutions at the federal, state and/or local levels. Such information can be sent by, for example, direct data connection, email, mail and/or fax. As an example, a user could submit the forms depicted in FIGS. 16A-16D to comply with California Water Code Section 5100 et seq.

In one embodiment, web server 101 projects future water usage balances in light of the user-entered data. Based on user-entered data along with transaction data and/or account balance received from water institution 103 and/or data received from other sources 109, reporting module 106 presents report 102 including projected balances and other useful information either in the context of HTML web pages or in other formats such as PDF, Microsoft Excel, and the like. In one embodiment, reporting module 106 is augmented by a module for generating a list of transactions that may or may not be interactive. Thus, the term "reporting module 106" is intended to be illustrative and not limiting. References herein to "reporting module 106" should be considered to encompass such variations as interactive registers, reports, graphs, charts, maps, forms and the like. Reports including projected balances are provided to browser 110 in HTML, PDF, Excel, or the like, and displayed to user 112. User 112A can also save and/or print such reports as desired.

The reporting module 106 is software and data operational on the server to generate representations of land. In one embodiment, reporting module 106 retrieves information from water institution 103, database 114, location module 105 and other data 109. The reporting module 106 generates representations that can be used in presenting results to the user 112, such as maps, charts, graphs, forms and the like. The reporting module 106 can be used to automatically enter data into forms, according to one embodiment. In one embodiment, the reporting module 106 is a graphics user interface as will be understood by those skilled in the art.

In one embodiment, web server 101 provides information for water planning purposes. The parameter module 130 receives one or more parameters related to water usage of a party. These parameters can include, for example, information about total available water in the system; water allocated to the party or to other parties; estimated, current or past usage by another party; evaporation data or estimates; salinity thresholds; climate data; data for the types of crops that have been or may be grown; crop rotation; soil type; ownership; water rights; financial support; financial investment; and the like. Web server 101 receives a request for outcomes related to projected water usage of the party. The outcome determination module 132 determines outcomes related to projected water usage by the party based at least in part on the received parameters. Outcomes related to projected water usage include, for example, information about water needs, return on investment, and crop yields. The outcomes related to projected water usage by the party are then displayed.

One skilled in the art will recognize that the system architecture illustrated in FIG. 1 is merely exemplary, and that the invention may be practiced and implemented using many other architectures and environments.

Methods

Figure 2:
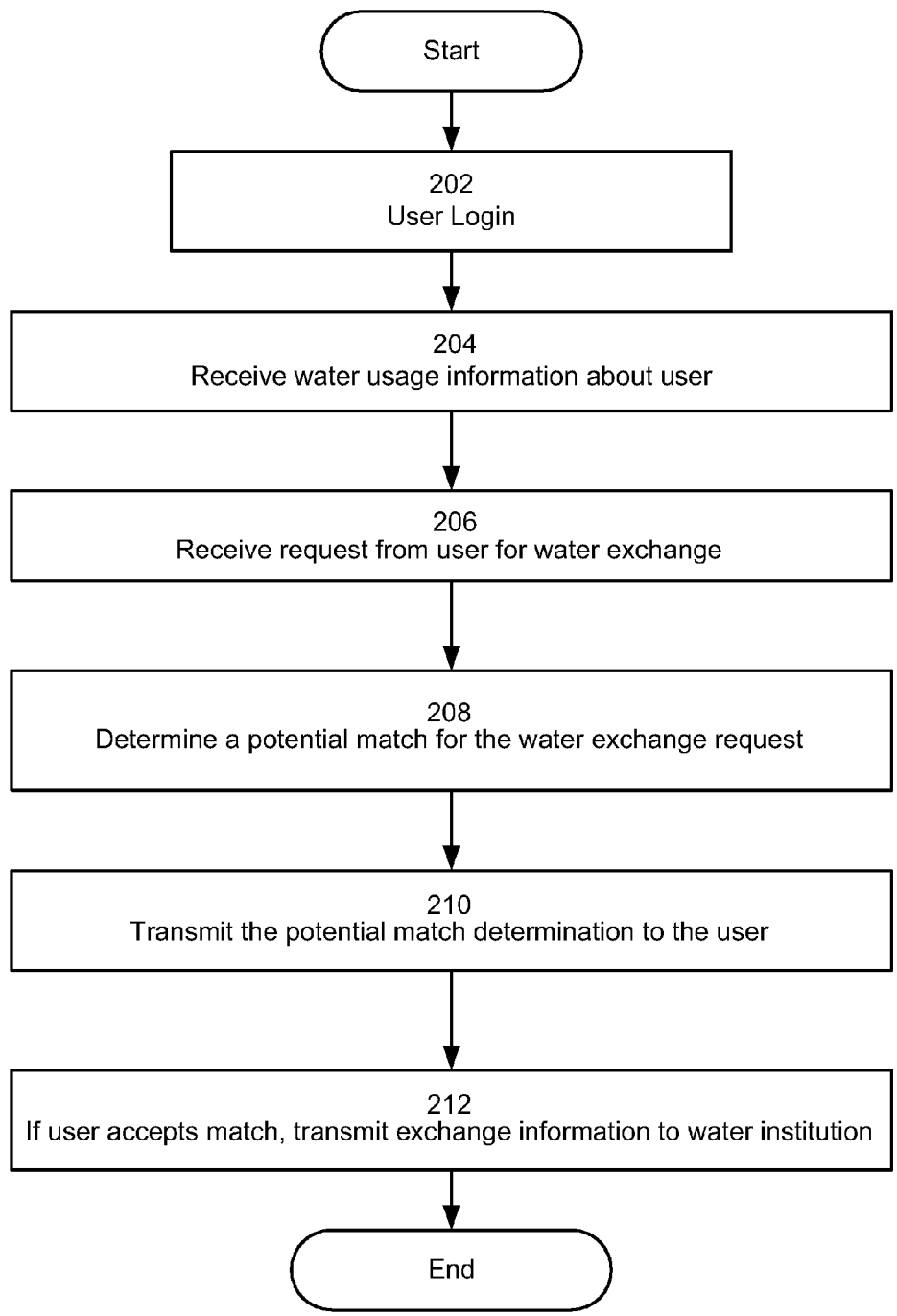
FIG. 2 is a flowchart depicting a method for practicing the present invention according to one embodiment.

Referring now to FIG. 2, a flowchart depicts a method for practicing the present invention according to one embodiment. User 112A logs in 202 and is authenticated. Water optimization web server 101 receives 204 water information usage data about the user 112, such as transaction data and/or account balance, from water institution 103. Optionally, exchange module 108 can present a user interface to user 112, including current balances, transactions, and other account information. In one embodiment, user 112A is given an opportunity to enter data, such as exchange requests. Water optimization web server 101 also receives this user-entered data 204.

Optionally, water optimization web server 101 also retrieves data from data store 114. Data from data store 114 may include, for example, user-entered data that was entered during previous visits to the website and/or data received electronically from the water institution 103 and/or data extracted from previous online sessions and/or other data received from, for example, other users.

Server communication module 152 receives 206 requests from users 112A-112N for a water exchange and sends the requests to water exchange module 218. Exchange module 108 determines 208 potential matches by searching for available water in the system database 114, which would include water that has not been released from users and/or available water released into the system by users. Server communication module 152 then transmits the potential matches 210 to client machine 107A via client communication module 120A. In one embodiment, the user can be prompted to indicate whether or not a proposed match is acceptable.

If the exchange is consummated, water optimization web server 101 transmits 212 information about such exchanges to the water institution 103, according to one embodiment. Water optimization web server 101 can then determine the amount of available water by subtracting the released amount from the user's water balance or adding the acquired amount to the user's balance. In one embodiment, report generation module 106 generates and displays a report, which may include projected balances and/or transactions.

By taking into account user-entered data and data from water institutions 103 and/or other data 109, report generation module 106 is able to generate projected balances that more accurately reflect user's 112A projected water usage. Report 102 may be a static report, a dynamic report allowing user interaction, or an input/output screen that allows the user to update, view, modify, and otherwise interact with transaction data. Report 102 may be in the form of a chart, graph, map, form or other useful output.

Figure 3:
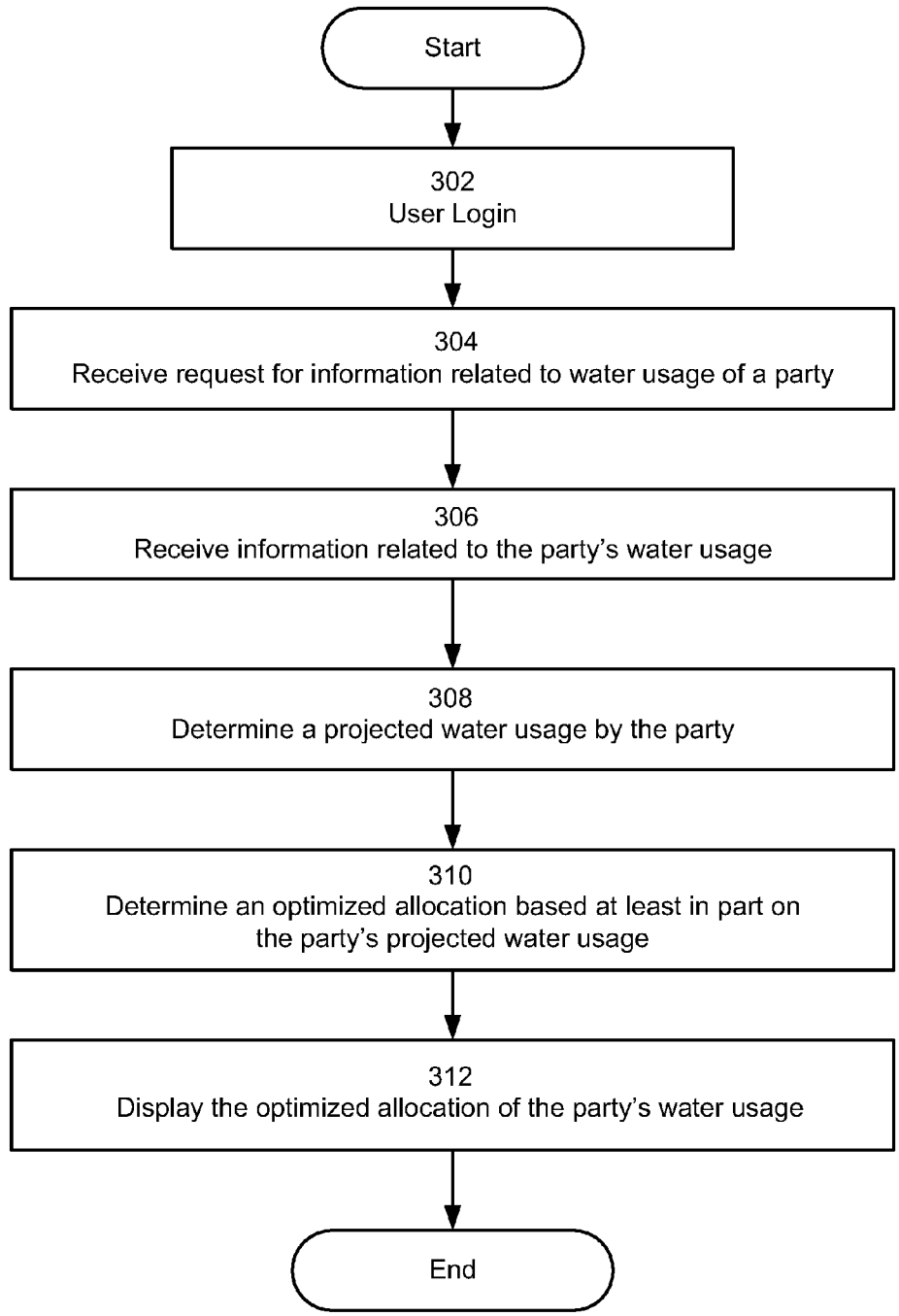
FIG. 3 is a flowchart depicting another method for practicing the present invention according to one embodiment.

Referring now to FIG. 3, a flowchart depicts a method for practicing the present invention according to another embodiment. User 112A logs in 302 and is authenticated. Water optimization web server 101 receives 304 a request for information related to the water usage by a party. The system receives 306 water information usage data about the party, such as transaction data and/or account balance from water institution 103 or information provided by user 112A or other data 109. Optionally, water optimization web server 101 also retrieves data from data store 114.

Based on the received information, water optimization web server 101 determines 308 a projected water usage by the party. To determine the projected usage, water optimization web server 101 may consider, for example, current water usage by the party, past water usage by the party, evaporation estimates, crop information, soil types, and climate estimates.

Based at least in part on the party's projected water usage, water optimization web server 101 determines 310 an optimized allocation of the party's water usage. To determine the optimized allocation of the party's water usage, water optimization web server 101 may consider a variety of factors. Examples of such factors include information about total available water, estimated usage by another party, current water usage by another party, past water usage by another party, evaporation estimates, salinity information, crop information, soil types, water rights, and climate estimates. The water optimization web server 101 may also determine optimized allocation 310 in view of ground water, underflow, surface water, riparian, and pre-1914 appropriative rights. Water optimization web server 101 provides for display 312 of the optimized allocation of the party's water usage.

In another embodiment, the water optimization web server 101 uses optimized allocation to determine return on investment.

In another embodiment, the water optimization web server 101 uses optimized allocation to determine future usage.

In another embodiment, the water optimization web server 101 uses optimized allocation to determine environmental impact.

In another embodiment, the water optimization web server 101 uses optimized allocation to determine the optimal allocation of water rights.

In another embodiment, the water optimization web server 101 uses optimized allocation to aid in regional land use planning. In this embodiment, the system and methods could assist in the determination of the optimal location for developing land in light of water efficiency (for example, by developing the land least suitable for farming).

Figure 15:
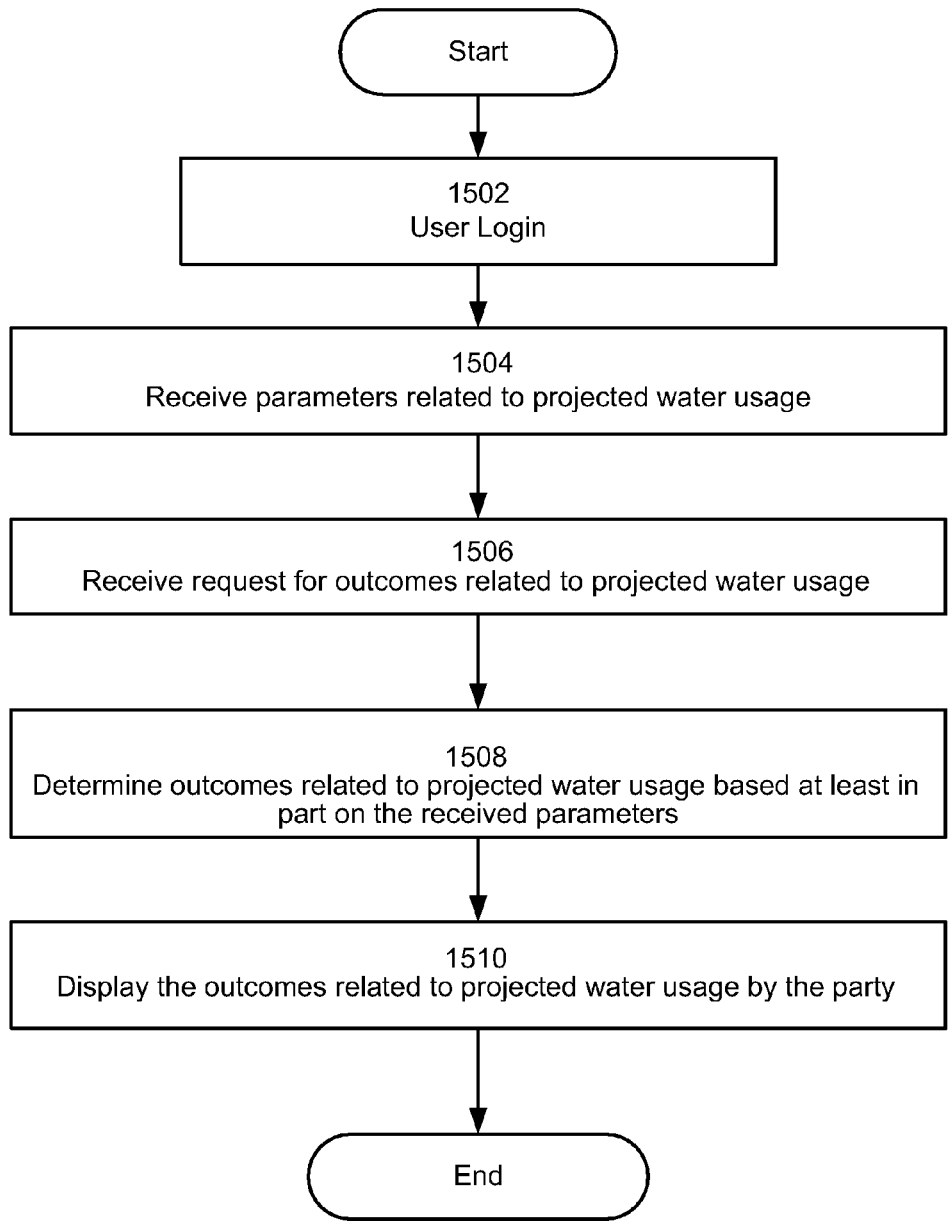
FIG. 15 is a flowchart depicting another method for practicing the present invention according to one embodiment.

Referring now to FIG. 15, a flowchart depicts another method for practicing the present invention according to one embodiment. User 112A logs in 1502 and is authenticated. Water optimization web server 101 receives 1504 parameters related to projected water usage. The received parameters may include information about total available water in the system; water allocated to the party or to other parties; estimated, current or past usage by another party; evaporation data or estimates; salinity thresholds; climate data; data for the types of crops that have been or may be grown; crop rotation; soil type; ownership; water rights; financial support; financial investment; and the like.

Water optimization web server 101 receives 1506 a request for outcomes related to projected water usage. Outcomes related to projected water usage include, for example, information about water needs, return on investment, land valuation and crop yields.

Water optimization web server 101 determines 1508 outcomes related to projected water usage, such as estimating projected water requirements and crop yields, by taking into account various "what if" scenarios. An example of a GUI 1400 to allow a user to input such parameters is depicted, for example, in FIG. 14. After a parameter has been entered, the systems and methods can predict various outcomes, such as water availability, crop yields and usage. Water optimization web server 101 displays 1510 the outcomes related to projected water usage by the party.

In another embodiment, outcome determination module 132 determines outcomes related to projected water usage, which can then be used in error analysis and/or data verification of water usage received from water institutions 103. The outcomes related to projected water usage can also be used in determining the appropriate asking or purchase price of a parcel of land. In another embodiment, the water optimization web server 101 can estimate how much water will be needed for a parcel of land in an upcoming season.

Figure 12:
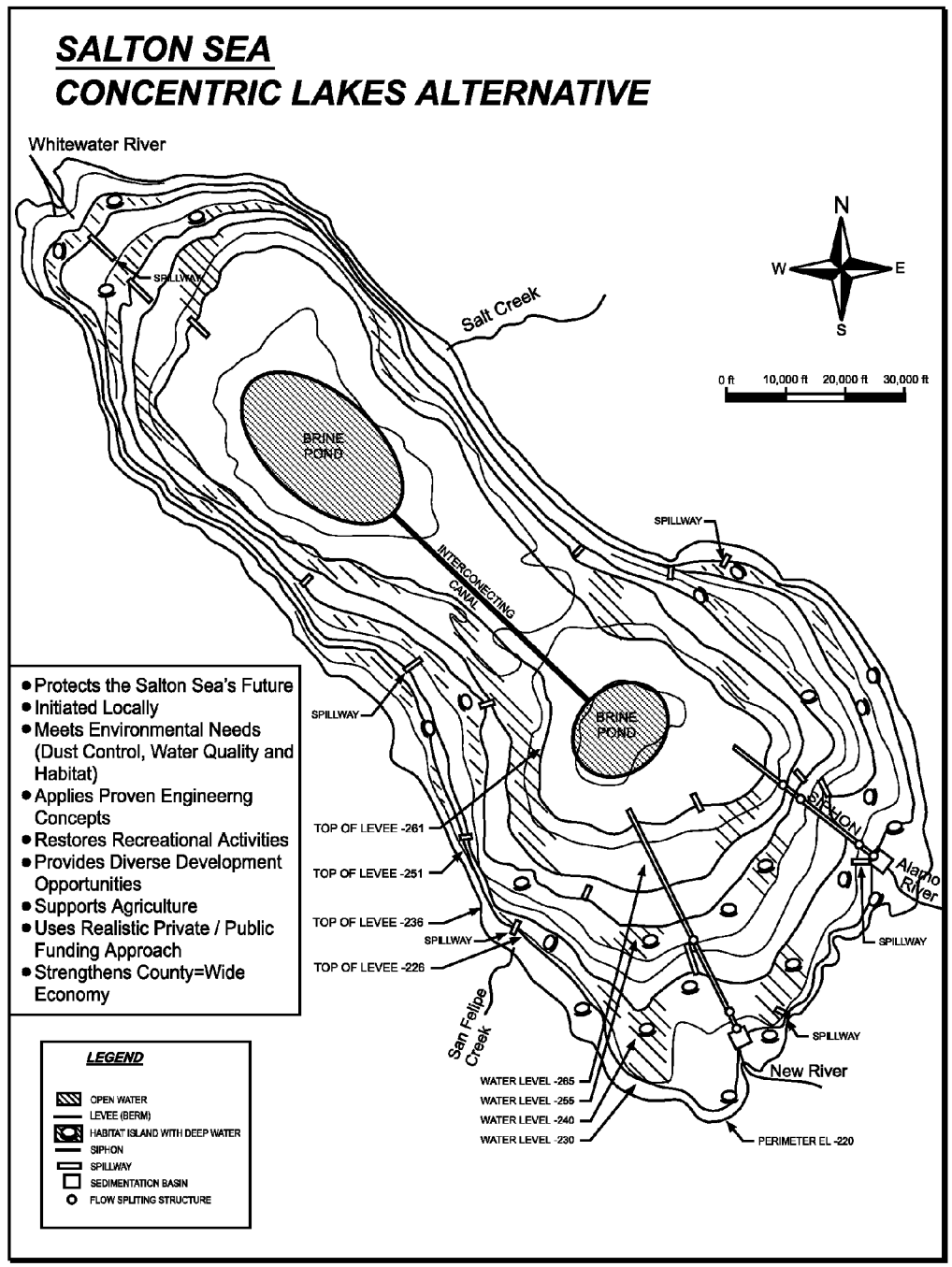
FIG. 12 is an example of how the present invention can address variation in the amount of water supplied to the Salton Sea.
Figure 13:
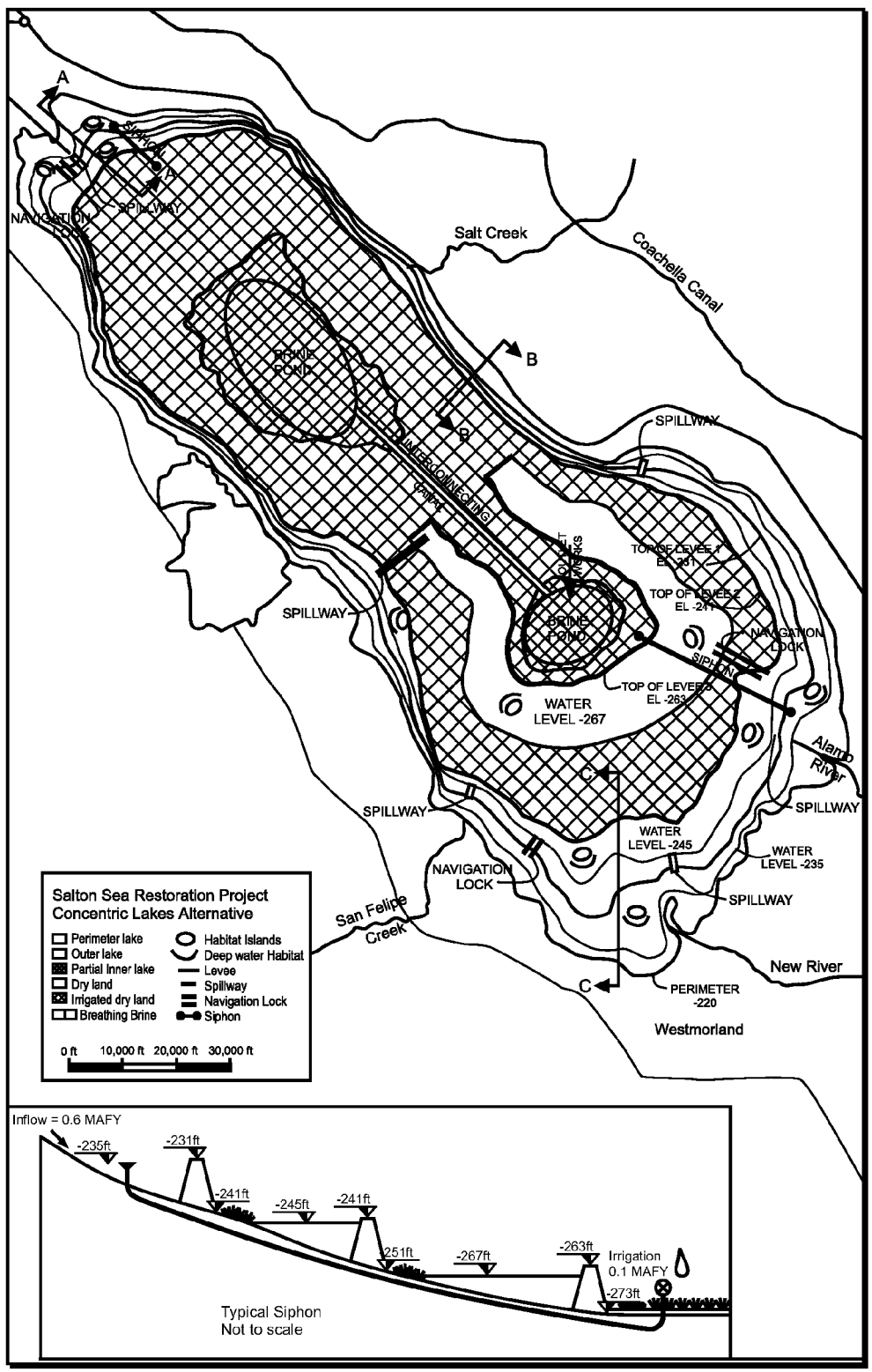
FIG. 13 is another example of how the present invention can address variation in the amount of water supplied to the Salton Sea.

In another embodiment, the water optimization web server 101 determines evaporation and flow to and from bodies of water. For a particular example, as depicted in FIGS. 12 and 13, the systems and methods can address variation in the amount of water supplied to the Salton Sea as compared with competing interests. The Salton Sea varies in dimensions and area due to changes in agricultural runoff and rain as well as evaporation. In one embodiment, the systems and methods take into account various factors, such as climate changes, evaporation and water flow.

As an example, if a parameter were input that a body of water would receive an allocation of water to maintain a salinity concentration of 40,000 parts per million, the system could determine whether the amount of water allocated for a particular parcel of land would sustain a particular crop in light of climate estimates, for example.

As another example, by providing for more accurate planning, the present invention would mitigate serious problems if the Salton Sea were otherwise allowed to dry out. For example, without water optimization, air pollution from the fine salts left after the Salton Sea dried out would likely damage crops and adversely affect human health. In addition, many bird species rely on the Salton Sea as their habitat might be harmed if the Salton Sea is not maintained. Further, nearby communities might be subject to windstorm damage, and salts and odors if water planning to the Salton Sea is not executed accurately. By ensuring that water flows in to and out of the Salton Sea are measured accurately, the allocation of water for the Salton Sea and other potentially competing purposes can be optimized. The examples depicted in FIGS. 12 and 13 show how the system and method can be used to determine an optimized distribution of water in light of specified parameters, such as cost, evaporation, salinity thresholds and/or other variables.

Graphical User Interface

The water optimization web server 101 displays a variety of information related to water usage. The system can present a user interface to user 112, including a graphical representation of the historical, current, projected and/or optimized data in such forms as a chart, graph, map, report, summary or the like.

Referring now to FIGS. 4-11 and 14, example graphical user interfaces (GUIs) in accordance with embodiments of the present invention are shown. FIGS. 4-11 and 14 show the GUI in different stages of interacting with the user 112.

Figure 4:
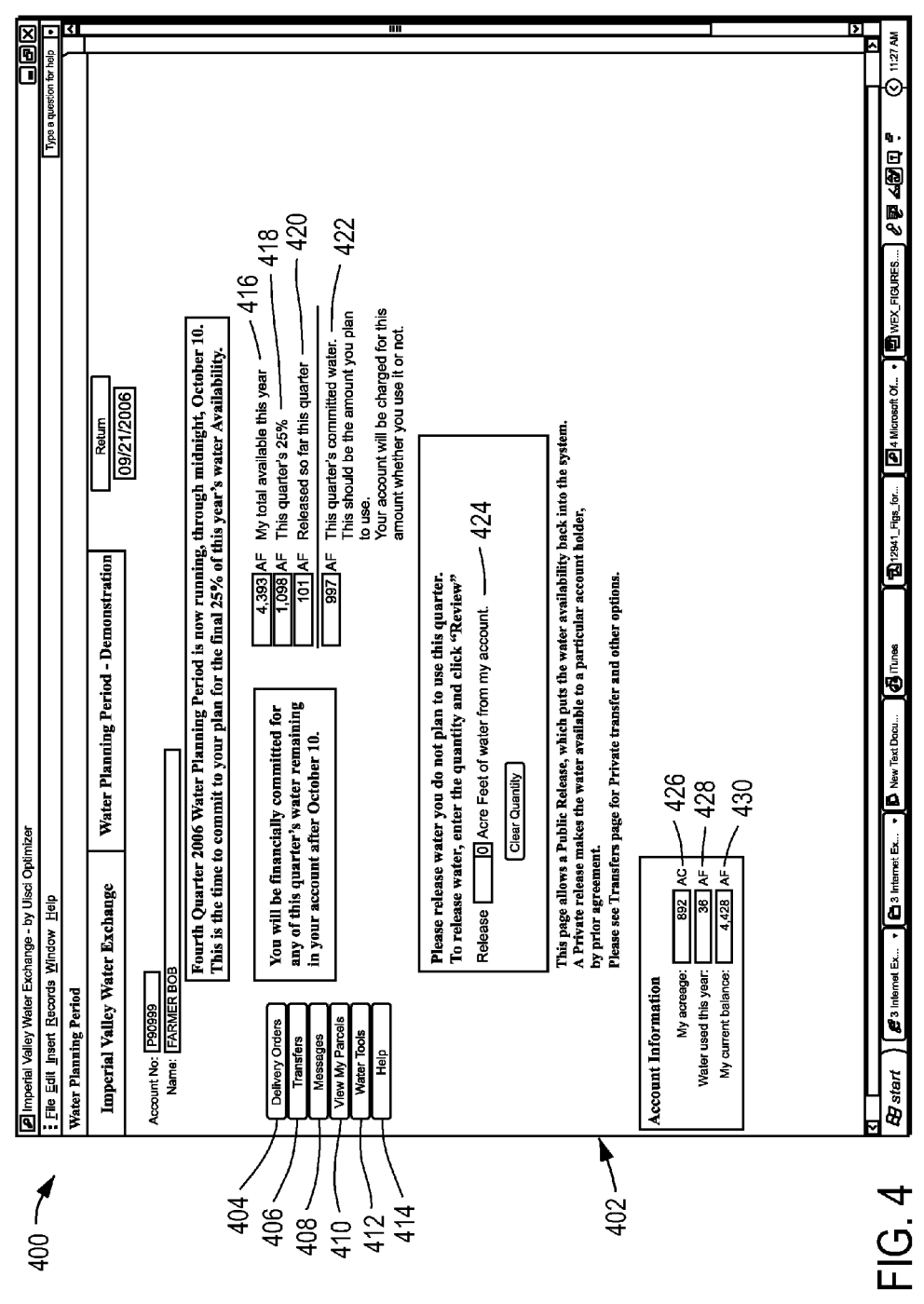

FIG. 4 illustrates one example of the GUI 400 for presenting data from the water optimization web server 101 in accordance with the present invention. As can be seen in FIG. 4, the right portion of the window 402 includes buttons 404, 406, 408, 410, 412, 414 for controlling the different views. In this GUI, the user 112A can make a public release 424 of water back into the water optimization system 100. A user 112A can also receive information about his or her total available water for the year 416, amount used in the current quarter 418, amount released in the current quarter 420, the quarter's committed water 422 (which is the amount the user plans to use and for which the user will be charged regardless of use), total acreage 426, water used in the year 428 and water balance 430.

Figure 5:
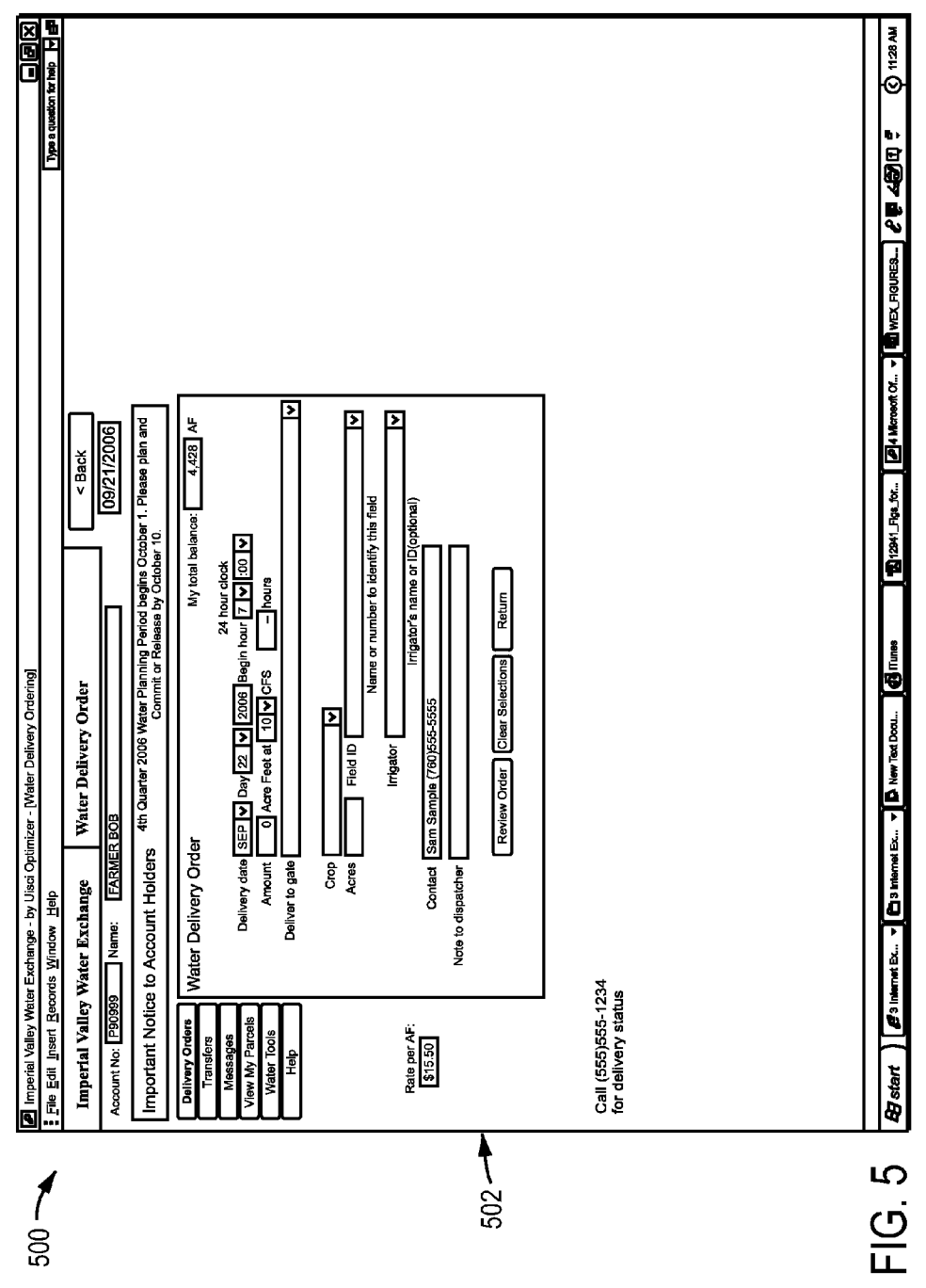

FIG. 5 shows a graphical representation of a window 502 showing another GUI 500 of the present invention. FIG. 5 illustrates one embodiment of a water delivery order. This allows the user to determine the amount, date and time of delivery of water and to which gate, field, and crop it will be delivered. It also allows for the irrigator's name to be associated with the order for the user's accounting purposes. Such an order could be sent to the water institution 103 to direct the water institution to release the water as desired. In addition to providing an effective way of accounting for water usage, the system provides for various data to be stored with each water delivery, providing for increased accuracy in the water projections and optimization calculations, as well as a rich data store for any other use.

While the GUI 500 displayed has been shown with particular locations, color schemes, entry fields, and organization, those skilled in the art will realize that these are provided only by way of example and in alternate embodiments a variety of different display formats, organization schemes and color schemes may be used for this GUI 500 and the other GUIs of the present invention.

Figure 6:
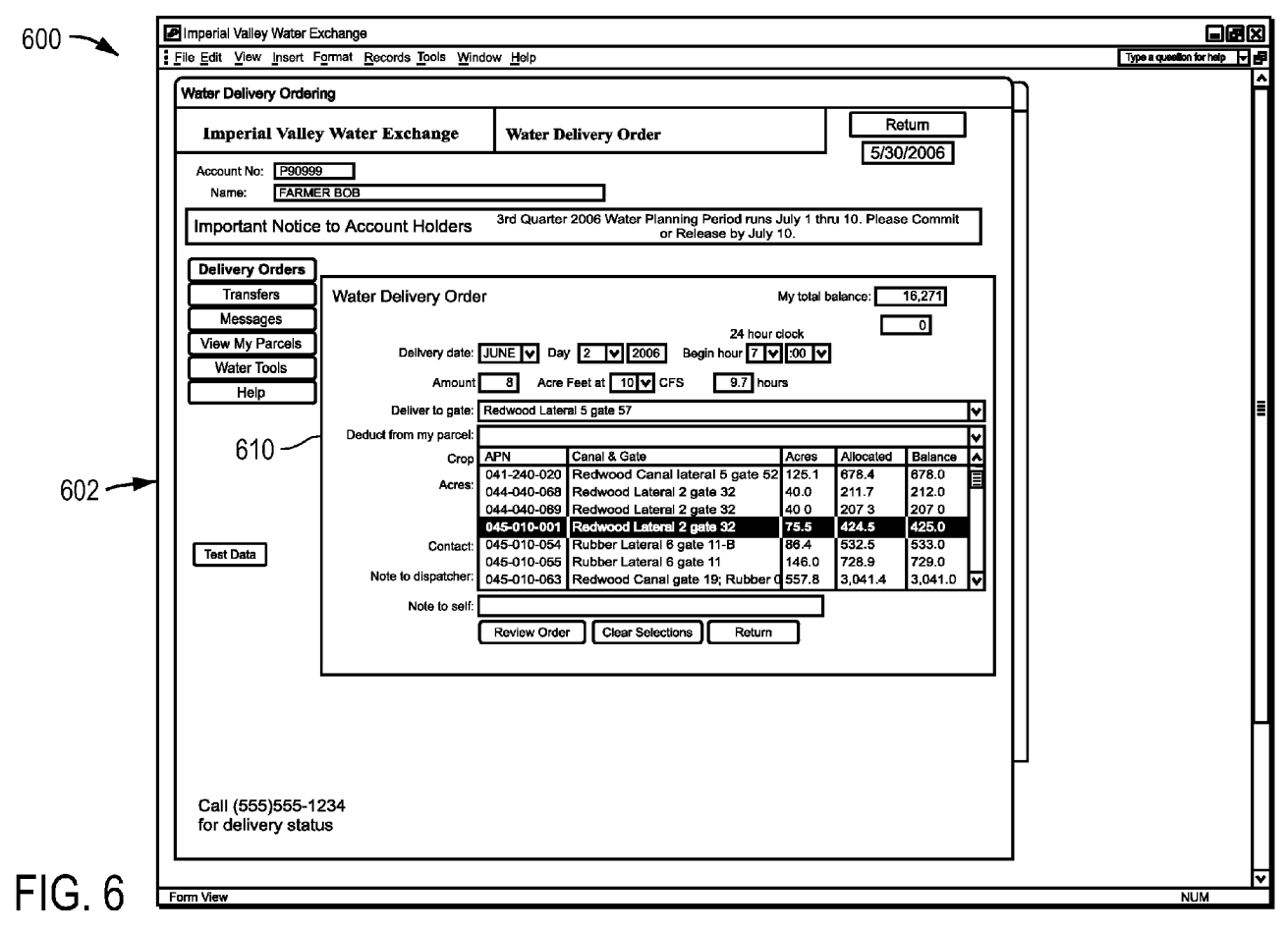

FIG. 6 shows a graphical representation of a window 602 showing another GUI 600 of the present invention. FIG. 6 illustrates another embodiment of a water delivery order. This GUI 600 provides a way to specify to which parcel and gate 610 the water should be delivered.

Figure 7:
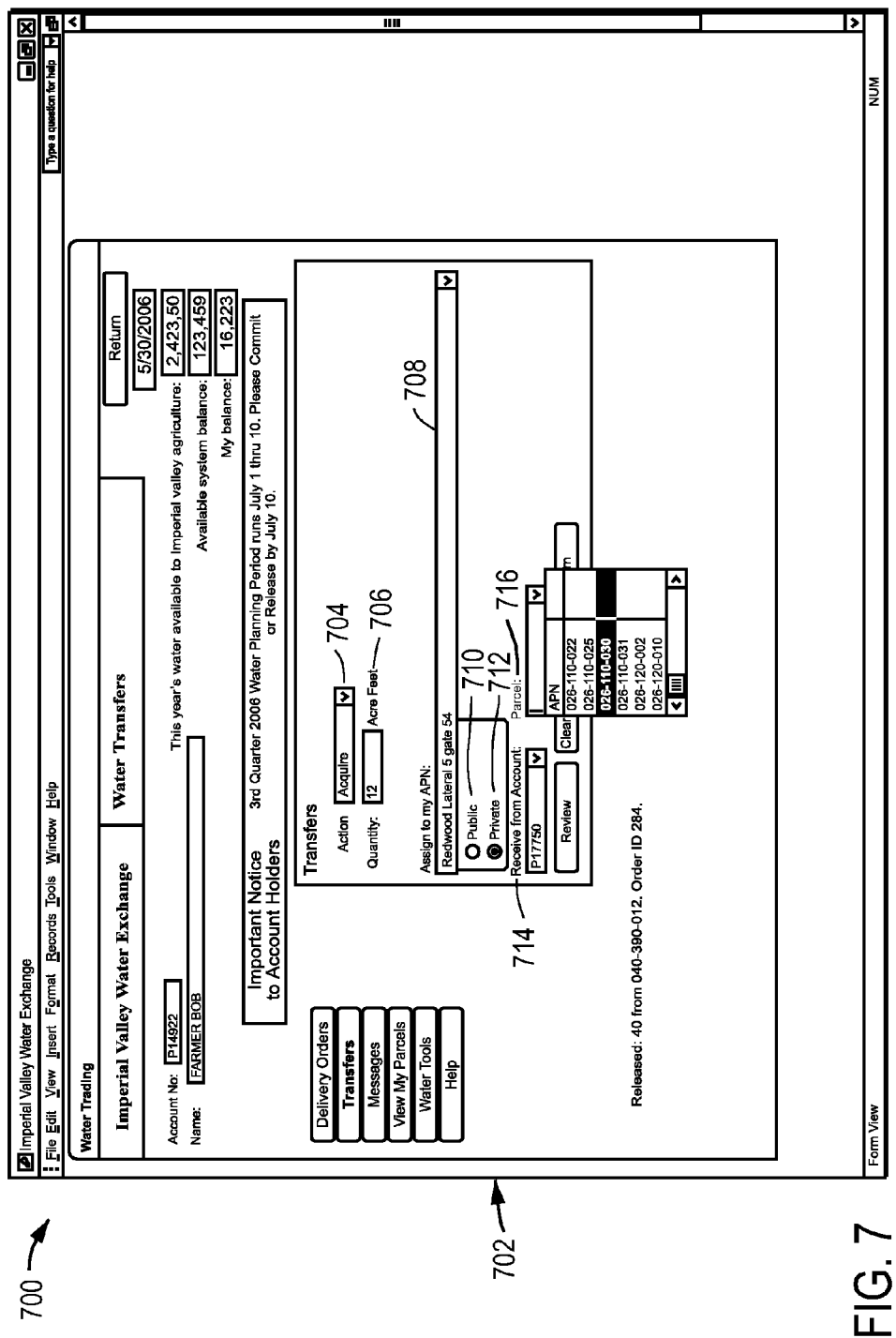
FIG. 7 is a graphical representation of a display device depicting an example of a water transfer acquisition request according to one embodiment.

FIG. 7 shows a graphical representation of a window 702 showing another GUI 700 of the present invention. FIG. 7 illustrates an embodiment of a water transfer request. This GUI 700 provides a way to specify a desired water acquisition 704 or release (not shown) by quantity 706, acquiring APN (Assessor's Parcel Number) 708, releasing account 714 and APN 716, and whether the transfer will be public (i.e. with another user) 710 or private (i.e. with the water optimization system) 712, according to one embodiment.

Figure 8:
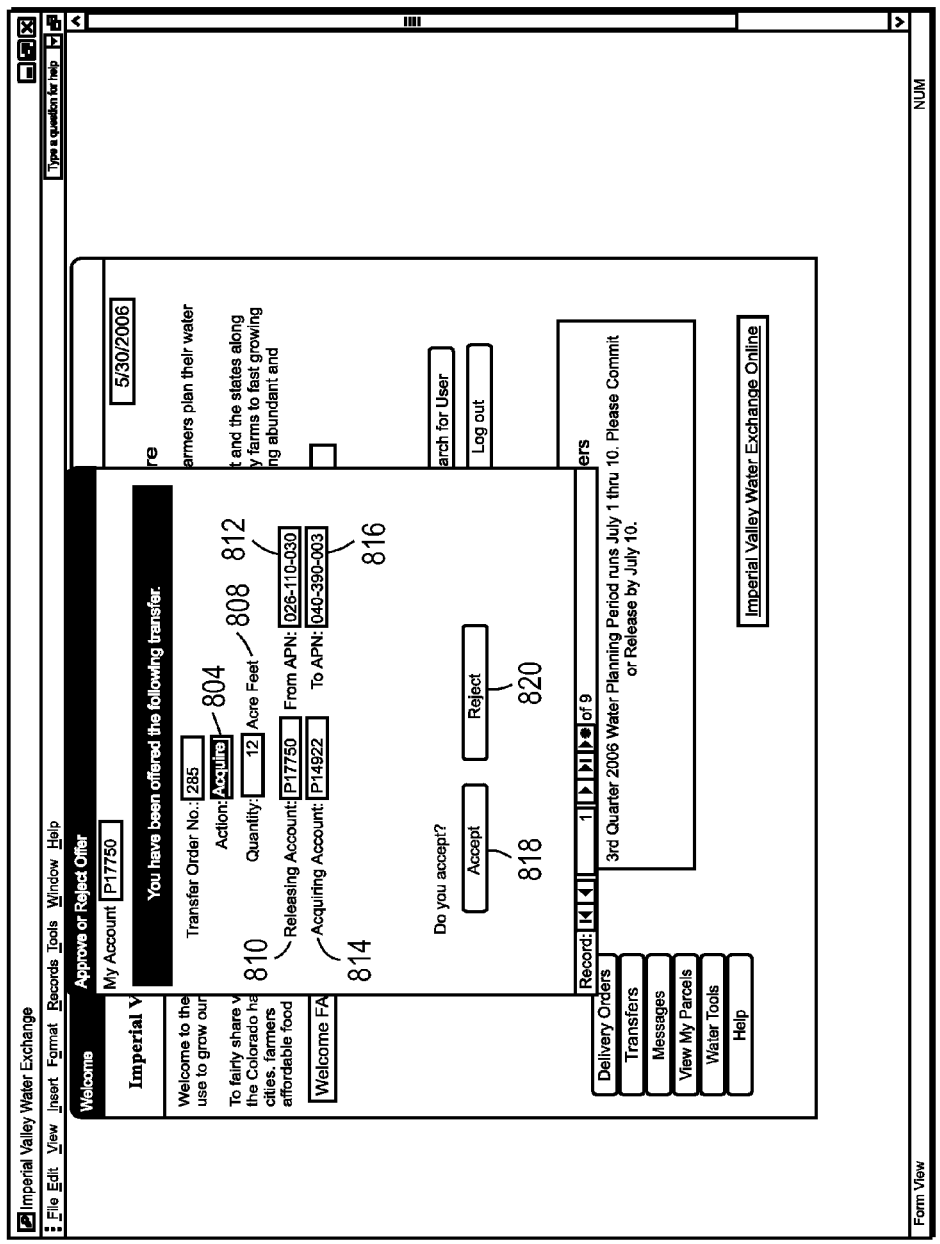
FIG. 8 is a graphical representation of a display device depicting an example of a water transfer acquisition request according to one embodiment.

FIG. 8 shows a graphical representation of a window showing another GUI 800 of the present invention. FIG. 8 illustrates an embodiment of a water transfer confirmation screen. In the embodiment depicted, the user is presented with a potential match for a water exchange, in this embodiment a desired acquisition. The GUI 800 shown displays the requested action (i.e. acquire or release) 804, the quantity 808, the releasing account 810 and APN 812, and the acquiring account 814 and APN 816. The user may accept 818 or reject 820 the potential match for the water transfer, according to one embodiment.

Figure 9:
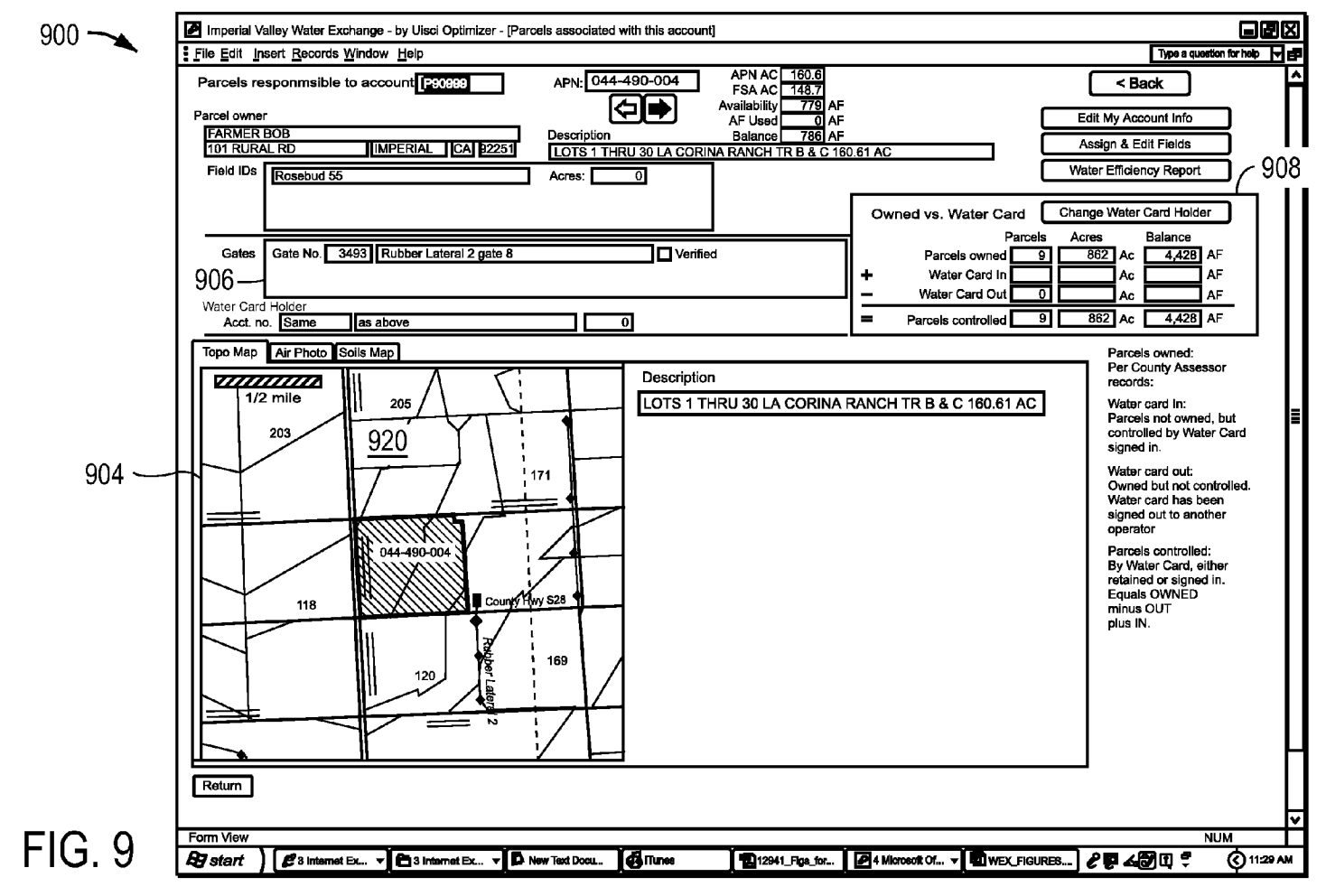
Figure 10:
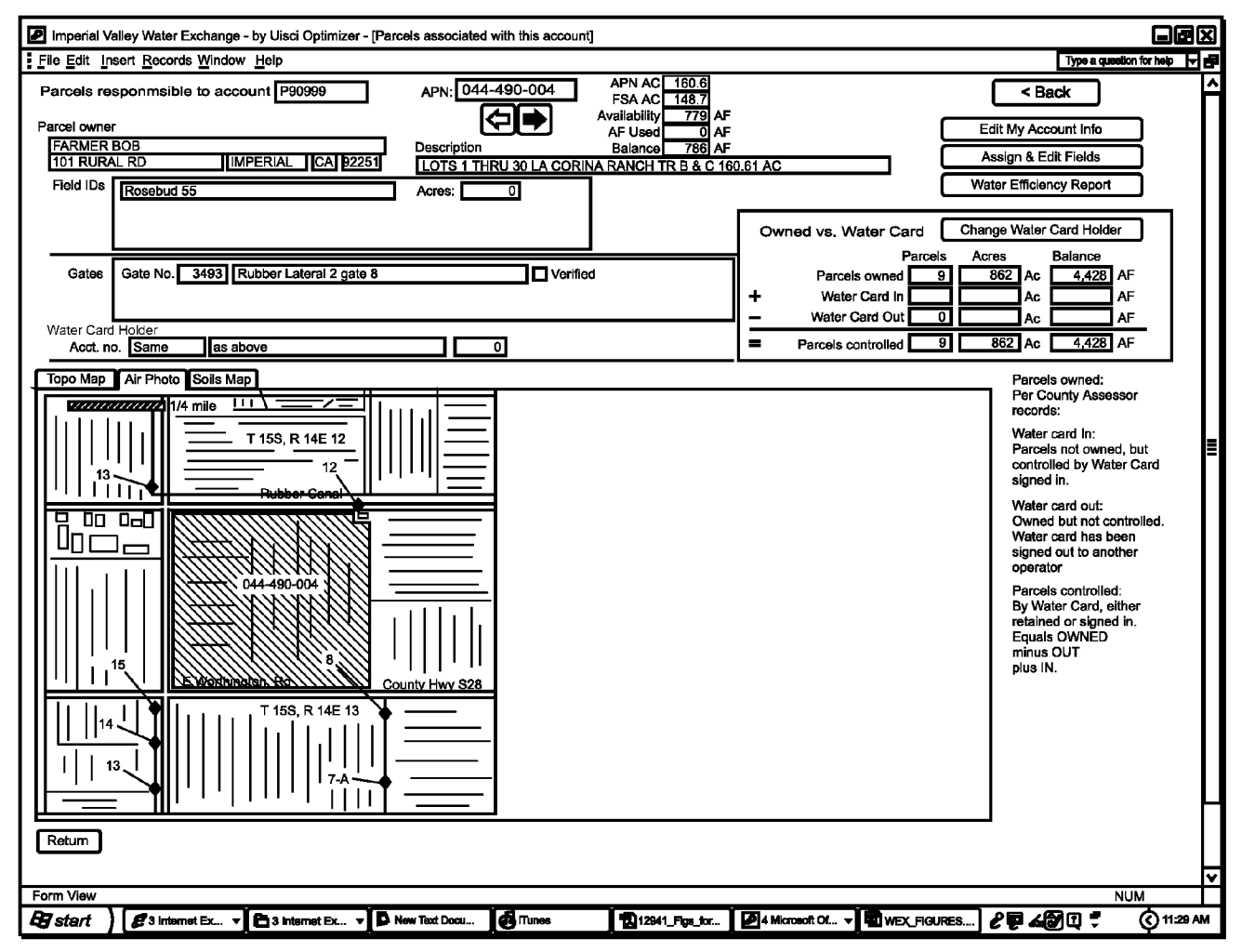
Figure 11:
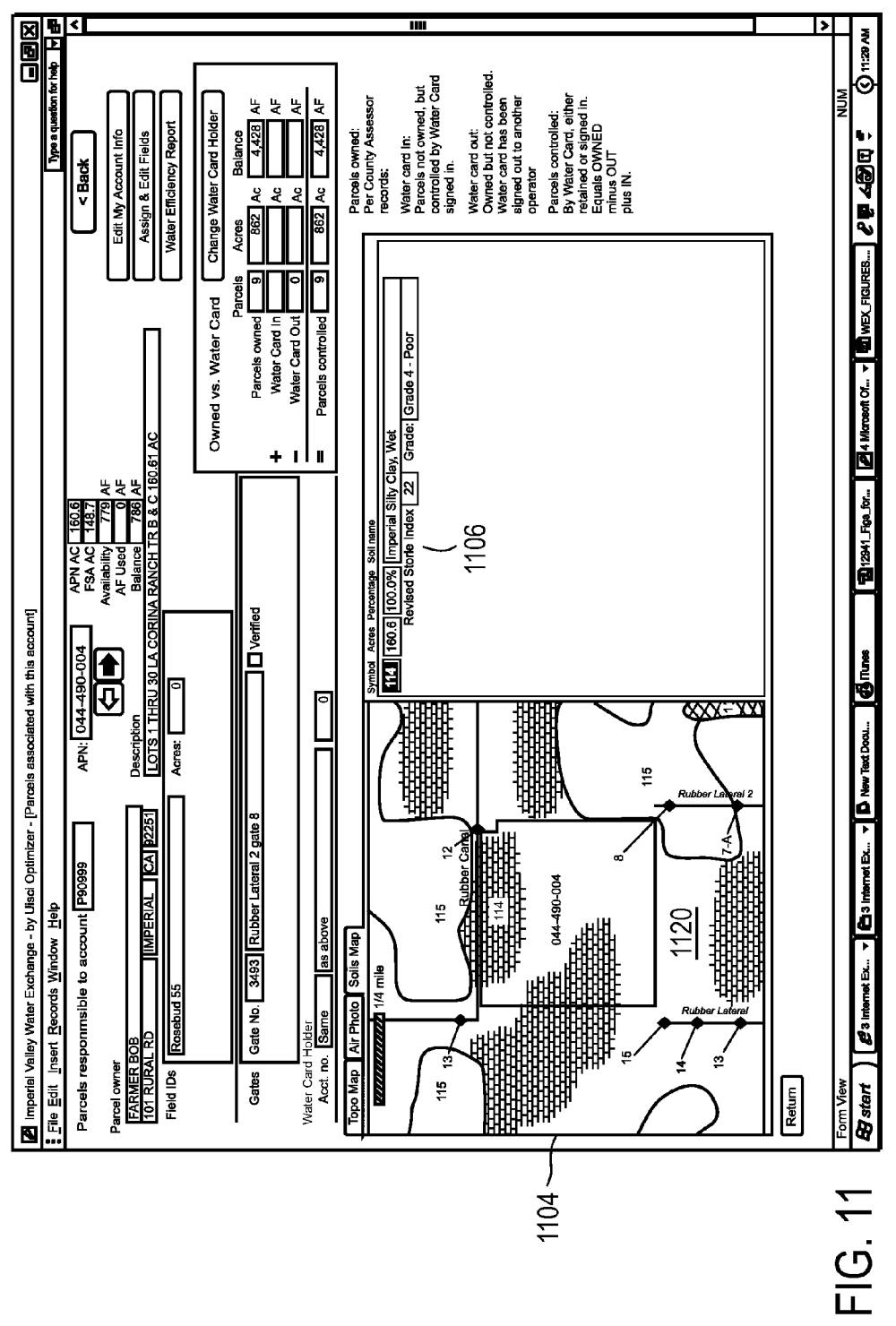

FIGS. 9-11 are screen shots depicting examples of maps of parcels owned and/or controlled by an account holder according to various embodiments. In these embodiments, a water card holder could assign his or her card to another user. Water Cards are one example of an accounting system used to record temporary transfers of water usage where one person leases land to be farmed by another person. These embodiments also provide for generation of a water efficiency report. In one embodiment, the water efficiency report can be used in determining an optimized allocation of water.

FIG. 9 is a screen shot depicting an example of a topographic map of parcels owned and/or controlled by an account holder. FIG. 10 is a screen shot depicting an example of an air photographic map of parcels owned and/or controlled by an account holder. FIG. 11 is a screen shot depicting an example of a report and soils map of parcels owned and/or controlled by an account holder.

Referring now to FIG. 9, the GUI 900 also includes a first display region 904 in which one view of a map 920, chart or graph is presented. A second display region 906 is provided to display and/or receive data and/or parameters. A third display region 908 is provided to display a water balance.

In region 904, there is shown an example of a map 920 that may be generated by reporting module 106 and presented to user 112A, according to the techniques of the present invention. One skilled in the art will recognize that the particular characteristics, layout, and elements of map 920 are presented here for illustrative purposes, and that many variations are possible. Map 920 may contain interactive components allowing for user input; one skilled in the art will recognize that such components can be omitted or modified and that in alternative embodiments map 920 can be non-interactive. For example, a user 112A can indicate that a specific portion of one or more parcels should have water released, which would then be depicted in map 920.

While the regions 904, 906 and 908 in FIG. 9 have been shown with particular locations, color schemes and organization, those of ordinary skill in the art will realize that these are provided only by way of example and in alternate embodiments a variety of different display formats, organization schemes and color schemes may be used for this GUI 900 and the other GUIs of the present invention. In another embodiment, the maps, tables or graphs can be used to examine trends associated with the parcels, such as water usage, crop types, or other information.

Referring now to FIG. 11, user 112A inputs information about the soil in second display region 1106, according to one embodiment. This information is then be depicted in map 1120 in the first display area 1104. The user could also provide information in second display region 1106 regarding the gates for a field; this information is also shown in map 1120 of FIG. 11.

Figure 14:
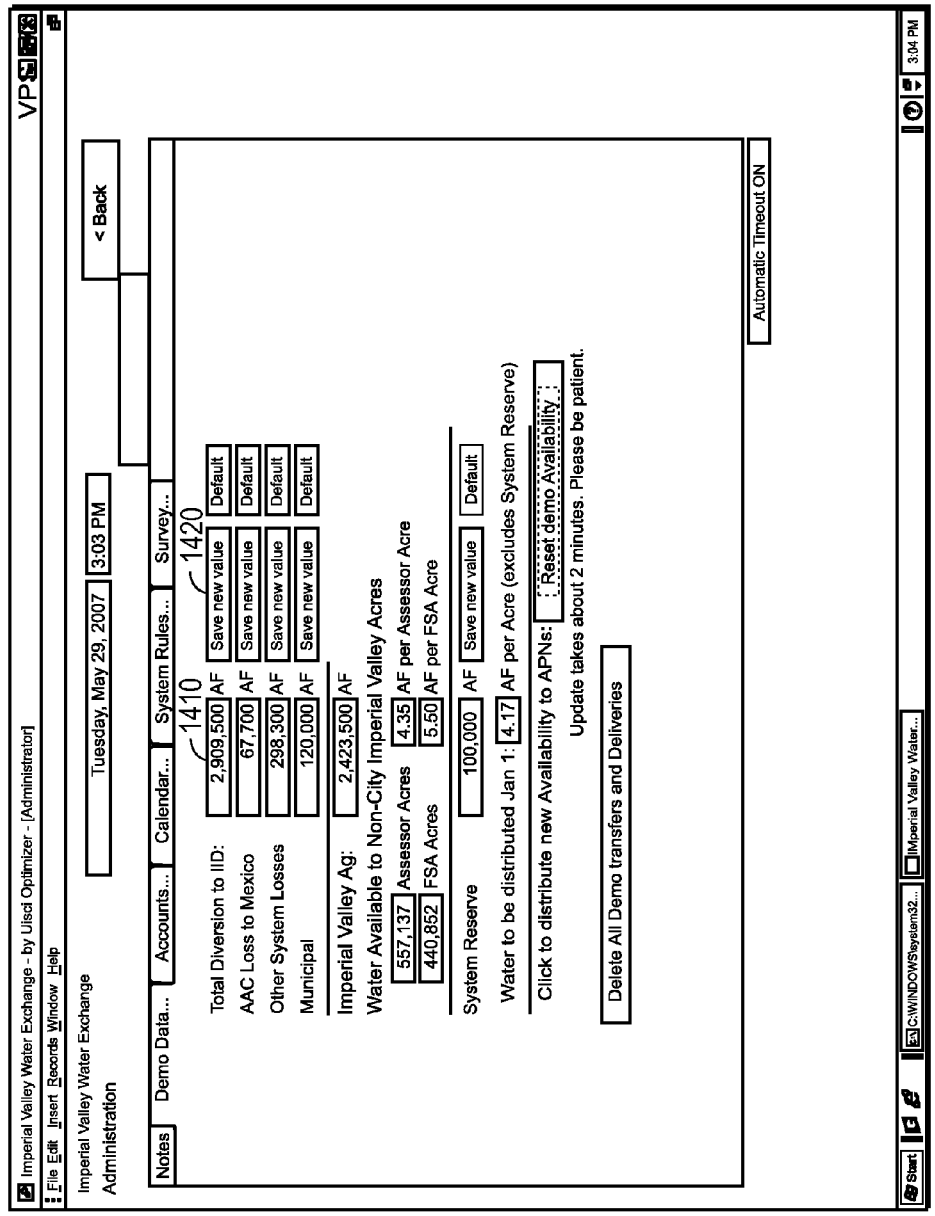
FIG. 14 is a graphical representation of a display device depicting an example of inputting parameters according to one embodiment.

FIG. 14 provides an example of a GUI 1400 to allow a user to input various parameters for water planning purposes by taking into account various "what if" scenarios. After a parameter has been entered, the systems and methods can predict outcomes related to water usage in light of the new input. In the user interface depicted, a user may enter a value in field 1410 and save it as a new value by selecting button 1420. As another example, if a parameter were provided that a specified number of acre feet of water would be available for a given user, the system could determine the best crops to be grown on a particular parcel of land in light of climate estimates, according to one embodiment.

FIGS. 16A-16D are examples of forms in which the reporting module 106 has automatically entered data, according to one embodiment. The mapping depicted in FIG. 16D can be generated by reporting module 106. In one embodiment, forms, such as those depicted in FIGS. 16A-16D, are signed by the user and sent to water institution 103. Water institution 103 then directs a water release consistent with the information contained in the forms.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Accordingly, the disclosure of the present invention is intended to be illustrative, but not limiting, of the scope of the present invention, which is set forth in the following claims.

The invention claimed is:

1. A computer-implemented method for water exchange, the method comprising:
   receiving, by a computer, a first request for water exchange from a first user, the first user seeking a release of a first amount of excess water, the release being controlled by a water institution;
   receiving, by the computer, information related to water usage and water rights of the first user;
   receiving, by the computer, a second request for water exchange from a second user, the second user seeking an acquisition of a second amount of excess water;
   determining, by the computer, a potential match between the first request and the second request including optimizing the potential match based on the water rights of the first user, water usage by another party, and a salinity threshold of a body of water in the region of the parties;
   transmitting, from the computer, the potential match determination to the second user for approval or rejection;
   receiving, from the second user, an approval of the potential match determination; and
   in response to receiving the approval of the potential match determination from the second user, transmitting information about the water exchange to the water institution.

2. The method of claim 1, further comprising:
   executing the water exchange; and
   displaying, at the computer, the first amount of excess water, the second request for the second amount of excess water, details of the potential match determination and, in response to an approved and executed water exchange, a remaining account balance of the water usage of the first user and water usage of the second user after the first request and the second request have been fulfilled.

3. The method of claim 2, further comprising:
   displaying geographic data related to one or more parcels associated with the water exchange between the first user and the second user.

4. The method of claim 2, further comprising:
   automatically inputting data at the computer into a displayed form using the first amount of excess water and a location.

5. The method of claim 2, further comprising automatically inputting data at the computer into a displayed form using the second amount of excess water and a location.

6. The method of claim 1, wherein the potential match for the first request and the second request comprises a potential match for water available from the first user in a water exchange system.

7. The method of claim 1, wherein the information related to the water usage and the water rights comprises information provided by the first user.

8. The method of claim 1, wherein the information related to the water usage and the water rights comprises information provided by a plurality of other users, and wherein the optimizing of the potential match is also based on the information provided by the plurality of other users.

9. The method of claim 1, wherein the information related to the water usage and the water rights comprises information provided by a government entity.

10. The method of claim 1, wherein the information related to the water usage comprises information provided by a water meter.

11. The method of claim 1, wherein the first request and the second request are for an exchange of water described in a water card setting forth an accounting system used to record temporary transfers of water usage.

12. The method of claim 1, wherein the potential match determination is dependent on the first amount of excess water being equal to or greater than the second amount of excess water.

13. The method of claim 1, further comprising transmitting, from the computer, details of the approved water exchange to a water regulatory institution or agency.

14. The method of claim 1, wherein the water exchange comprises an exchange of water rights.

15. A computer readable storage medium storing computer program code, the computer program code executable by a computer for causing the computer to perform a method for an exchange of water, the method comprising:
   receiving a first request for water exchange from a first user, the first user seeking a release of a first amount of excess water, the release being controlled by a water institution;
   receiving information related to water usage and water rights of the first user;
   receiving a second request for water exchange from a second user, the second user seeking an acquisition of a second amount of excess water;
   determining a potential match between the first request and the second request including optimizing the potential match based on the water rights of the first user, water usage by another party, and a salinity threshold of a body of water in the region of the parties;

transmitting the potential match determination to the second user for approval or rejection;

receiving from the second user an approval of the potential match determination; and in response to the approval of the potential match determination from the second user, transmitting information about the water exchange to the water institution.

16. The computer readable storage medium of claim 15, wherein the method further comprises:

outputting unique geographic data related to one or more parcels associated with the water exchange between the first user and the second user.

17. The computer readable storage medium of claim 16, wherein the method further comprises:

inputting the unique geographic data into a form.

18. The computer readable storage medium of claim 15, wherein the method further comprises:

receiving information provided by a government entity.

19. The computer readable storage medium of claim 15, wherein the method further comprises:

receiving information provided by the first user.

20. The computer readable storage medium of claim 15, wherein the method further comprises:

executing the water exchange.

21. The computer readable storage medium of claim 15, wherein the potential match determination is dependent on the first amount of excess water being equal to or greater than the second amount of excess water.

22. The computer readable storage medium of claim 15, wherein the method further comprises:

transmitting details of the approved water exchange to water regulatory institutions or agencies.

23. The computer readable storage medium of claim 15, wherein the water exchange comprises an exchange of water rights.

24. The computer readable storage medium of claim 15, wherein the water exchange comprises an exchange of a water card that indicates a user has rights.

* * * * *